US009783918B2

(12) United States Patent
Lee et al.

(10) Patent No.: US 9,783,918 B2
(45) Date of Patent: Oct. 10, 2017

(54) CONTROL METHOD FOR WALL-MOUNTED DRUM WASHING MACHINE

(71) Applicant: Dongbu Daewoo Electronics Corporation, Seoul (KR)

(72) Inventors: Ju Dong Lee, Incheon (KR); Ui Kun Hwang, Bucheon-si (KR); Jae Min Lee, Incheon (KR); Sung Su Joo, Bucheon-si (KR)

(73) Assignee: Dongbu Daewoo Electronics Corporation, Seoul (KR)

( * ) Notice: Subject to any disclaimer, the term of this patent is extended or adjusted under 35 U.S.C. 154(b) by 219 days.

(21) Appl. No.: 14/019,454

(22) Filed: Sep. 5, 2013

(65) Prior Publication Data

US 2014/0068873 A1 Mar. 13, 2014
US 2017/0254010 A9 Sep. 7, 2017

(30) Foreign Application Priority Data

Sep. 14, 2012 (KR) ................. 10-2012-0101977
Sep. 14, 2012 (KR) ................. 10-2012-0101979
Sep. 14, 2012 (KR) ................. 10-2012-0101980

(51) Int. Cl.
| | | |
|---|---|---|
| D06F 33/02 | (2006.01) |
| D06F 35/00 | (2006.01) |
| G01B 5/24 | (2006.01) |
| G01P 15/00 | (2006.01) |
| D06F 39/12 | (2006.01) |
| D06F 39/14 | (2006.01) |
| D06F 37/02 | (2006.01) |
| D06F 37/26 | (2006.01) |

(52) U.S. Cl.
CPC ............ *D06F 33/02* (2013.01); *D06F 35/005* (2013.01); *D06F 35/007* (2013.01); *G01B 5/24* (2013.01); *G01P 15/00* (2013.01); *D06F 37/02* (2013.01); *D06F 37/267* (2013.01); *D06F 39/12* (2013.01); *D06F 39/14* (2013.01); *D06F 2202/085* (2013.01); *D06F 2202/12* (2013.01); *D06F 2204/10* (2013.01); *D06F 2210/00* (2013.01); *D06F 2222/00* (2013.01); *Y10T 307/766* (2015.04)

(58) Field of Classification Search
None
See application file for complete search history.

(56) References Cited

U.S. PATENT DOCUMENTS

| | | | | |
|---|---|---|---|---|
| 2003/0024056 | A1* | 2/2003 | Kim .................. | D06F 33/02 8/158 |
| 2004/0010859 | A1* | 1/2004 | Kim .................. | D06F 35/006 8/148 |
| 2007/0283508 | A1* | 12/2007 | Wong ................ | D06F 35/006 8/149.3 |
| 2009/0183319 | A1* | 7/2009 | Chai et al. ............... | 8/159 |
| 2011/0252577 | A1* | 10/2011 | Kim et al. ............... | 8/137 |

\* cited by examiner

*Primary Examiner* — Michael Barr
*Assistant Examiner* — Cristi Tate-Sims

(57) ABSTRACT

A control method for a wall-mounted drum washing machine, which removes foams remaining in a detergent box and a conditioner box at a final stage of a spin-drying process of the wall-mounted drum washing machine, thereby maintaining the detergent box and the conditioner box in a clean state.

3 Claims, 38 Drawing Sheets

CONTROL METHOD FOR WALL-MOUNTED DRUM WASHING MACHINE

CROSS-REFERENCES TO RELATED APPLICATIONS

The present application claims priority to Korean application number 10-2012-0101977, 10-2012-0101979 and 10-2012-0101980, filed on Sep. 14, 2012, which is incorporated by reference in its entirety.

BACKGROUND OF THE INVENTION

The present invention relates to a control method for a wall-mounted drum washing machine, and more particularly, to a control method for a wall-mounted drum washing machine, which may effectively remove foams formed by detergent when a washing process is performed through the wall-mounted drum washing machine.

A general wall-mounted drum washing machine includes a cabinet, a tub movably installed in the cabinet and containing water therein, a drum rotatably installed in the tub and housing laundry therein, a driving unit to provide power to the drum, a water supply device supplying wash water to the tub, and a drain device discharging wash water from the tub to the outside of the cabinet.

When a user puts laundry into the drum and starts a washing process, wash water is supplied into the tub and the drum by operation of the water supply device, and the washing process is started as the drum is rotated by the operation of the driving unit.

After the washing process is ended, the wash water having been contained in the tub and the drum is discharged to the outside of the cabinet through the drain device by operation of the drain device.

The related art of the present invention is based on Korean Patent Laid-open Publication No. 10-2011-0023877 which discloses a direct drive apparatus for a drum-washing machine including a cover-integrated stator.

SUMMARY OF THE INVENTION

Embodiments of the present invention are directed to a control method for a wall-mounted drum washing machine, which differently determines the number of rinsing processes according to foams formed by detergent when a washing process is performed through the wall-mounted drum washing machine, thereby effectively removing remaining foams.

Embodiments of the present invention are directed to a control method for a wall-mounted drum washing machine, which removes foams remaining in a detergent box and a conditioner box at a final stage of a spin-drying process of the wall-mounted drum washing machine, thereby maintaining the detergent box and the conditioner box in a clean state.

Embodiments of the present invention are directed to a control method for a wall-mounted drum washing machine, which supplies water for a preset time at a final stage of a spin-drying process of the wall-mounted drum washing machine, thereby removing detergent residues in an elongated drain pipe.

In one embodiment, a control method for a wall-mounted drum washing machine includes: receiving, by a control unit, a rinsing level measured through a water level sensor, after a washing process is completed; determining a final number of rinsing processes according to the rinsing level; and performing the rinsing process according to the final number of rinsing processes.

The determining of the final number of rinsing processes may include: determining whether or not the rinsing level is equal to or more than a preset reference level; and determining an additional number of rinsing processes when the rinsing level is equal to or more than the preset reference level.

The control unit may determine the additional number of rinsing processes according to the corresponding relation between the rinsing level and the number of rinsing processes, which is previously stored in a memory unit.

The final number of rinsing processes may be determined according to an initial number of rinsing processes and the additional number of rinsing processes.

In another embodiment, there is a control method for a wall-mounted drum washing machine including a detergent box and a conditioner box which are inserted into a tub through a front panel. The control method includes: reducing, by a control unit, the RPM of a motor during a spin-drying process; opening, by the control unit, a water supply valve for a preset foam removal time, when the RPM of the motor reaches a preset reference speed; and stopping, by the control unit, the motor to complete the spin-drying process, after the foam removal time passes.

The control unit may rotate the motor at the reference speed for the foam removal time.

In another embodiment, there is provided a control method for a wall-mounted drum washing machine including a detergent box and a conditioner box which are inserted into a tub through a front panel. The control method includes: stopping, by a control unit, control for a motor during a spin-drying process; determining, by the control unit, whether or not a foam removal condition is satisfied, after the control for the motor is stopped; opening, by the control unit, a water supply valve for a preset foam removal time, when it is determined that the foam removal condition is satisfied; and stopping, by the control unit, the motor to complete the spin-drying process, after the foam removal time passes.

The foam removal condition may be satisfied when the RPM of the motor reaches a preset reference speed.

The control unit may rotate the motor at the reference speed for the foam removal time.

The foam removal condition may be satisfied when a preset time passes from the time at which the control for the motor is stopped.

The control unit may rotate the motor at an RPM at the time at which the preset time passed, for the foam removal time.

In another embodiment, there is provided a control method for a wall-mounted drum washing machine which is installed at a predetermined height from the ground such that a drain pipe is extended. The control method includes: maintaining, by a control unit, the RPM of a motor at a preset speed during a deceleration section of a spin-drying process; supplying water for a preset time after the RPM of the motor is maintained at the preset speed; and stopping the motor to end the spin-drying process, after the preset time passes.

The deceleration section may include a section in which the motor is stopped after the RPM of the motor reaches a maximum speed, during the spin-drying process.

DESCRIPTION OF SPECIFIC EMBODIMENTS

Hereinafter, exemplary embodiments of the present invention will be described in detail with reference to the accompanying drawings.

Figure 1:
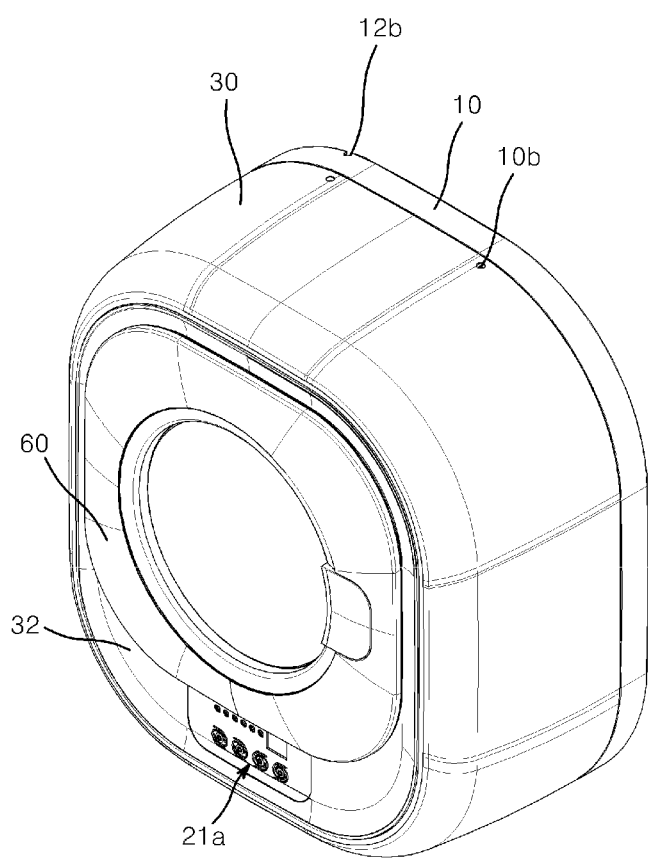
FIG. 1 is a perspective view of a wall-mounted drum washing machine in accordance with an embodiment of the present invention.
Figure 2:
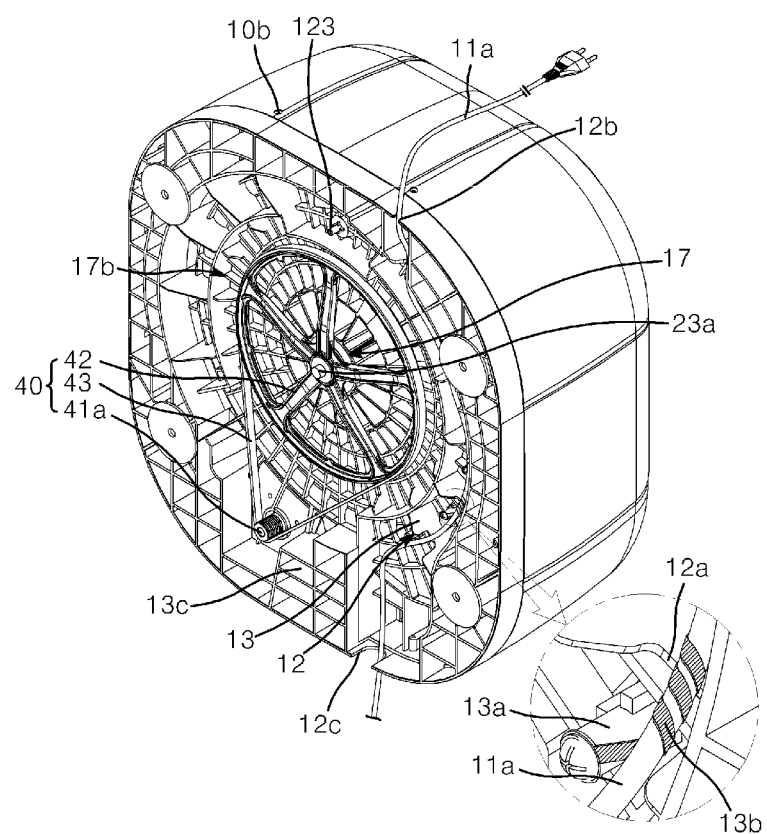
FIG. 2 is a rear perspective view of the wall-mounted drum washing machine in accordance with the embodiment of the present invention.
Figure 3:
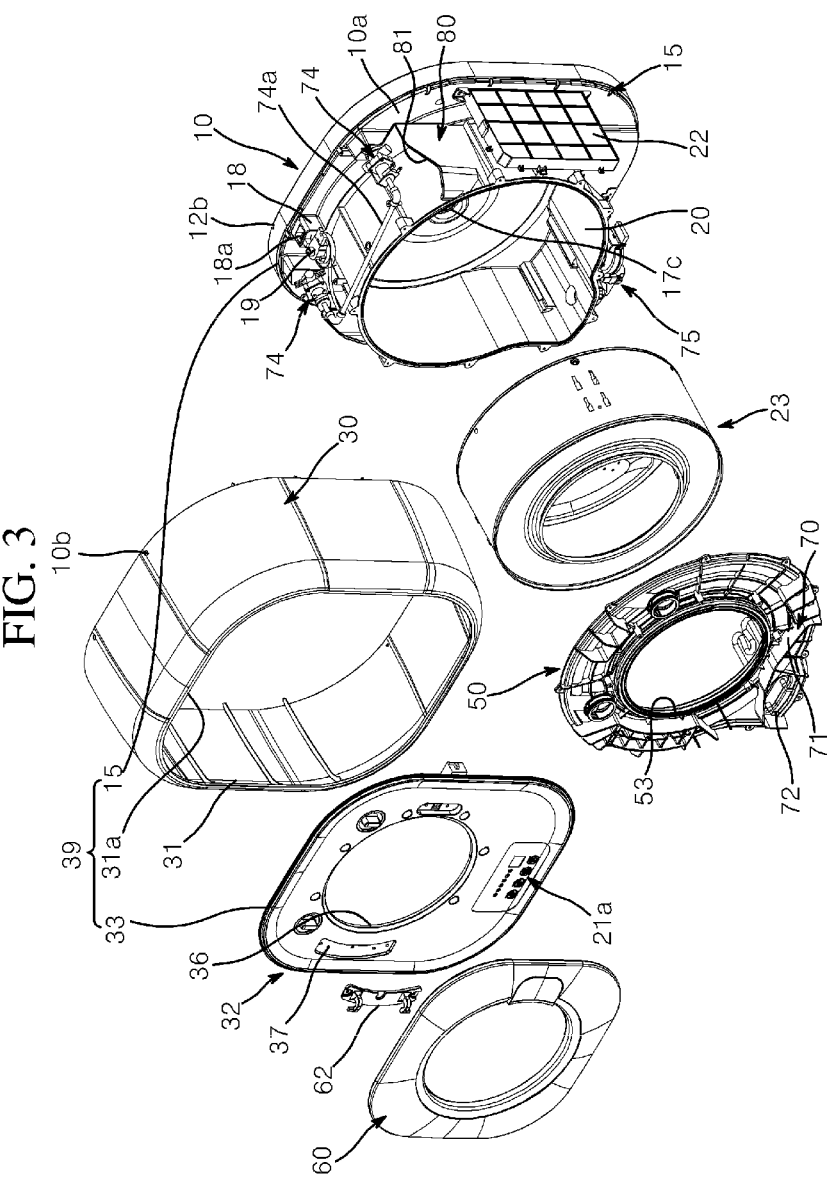
FIG. 3 is an exploded perspective view of the wall-mounted drum washing machine in accordance with the embodiment of the present invention.
Figure 4:
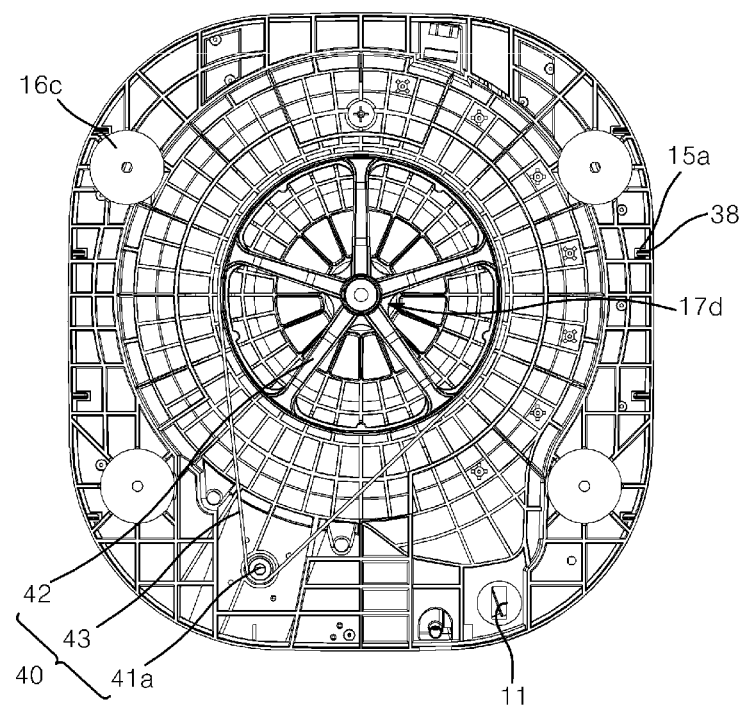
FIG. 4 is a rear view of the wall-mounted drum washing machine in accordance with the embodiment of the present invention.

FIG. 1 is a perspective view of a wall-mounted drum washing machine in accordance with an embodiment of the present invention. FIG. 2 is a rear perspective view of the wall-mounted drum washing machine in accordance with the embodiment of the present invention. FIG. 3 is an exploded perspective view of the wall-mounted drum washing machine in accordance with the embodiment of the present invention. FIG. 4 is a rear view of the wall-mounted drum washing machine in accordance with the embodiment of the present invention.

Referring to FIGS. 1 to 4, the wall-mounted drum washing machine in accordance with the embodiment of the present invention includes a rear panel 10 mounted on a wall surface, a tub 20 containing wash water therein and supported by the rear panel 10, a drum 23 rotatably installed in the tub 20 and housing laundry therein, a driving unit 40 providing power to rotate the drum 23, a water supply device 74 and 74a supplying wash water to the tub 20, and a drain device 75 discharging wash water from the tub 20 to the outside.

A front panel 50 having an opening 54 formed therein is installed on the tub 20, and a box unit 30 is installed on the rear panel 10 so as to surround the tub 20.

A cover unit 32 is installed at the front of the box unit 30 so as to cover the front panel 50.

The front panel 50 is covered by the cover unit 32, the cover unit 32 is elastically coupled and reliably fixed to the box unit 30, and the box unit 30 is coupled to the rear panel 10 mounted on the wall surface W (refer to FIG. 8) through a coupling member or the like. Thus, a damper or damping spring for supporting the front side of the tub 20 does not need to be separately provided unlike the conventional wall-mounted drum washing machine, but the front side of the tub 20 may be supported while vibrations at the front side of the tub 20 are reduced.

Figure 17:
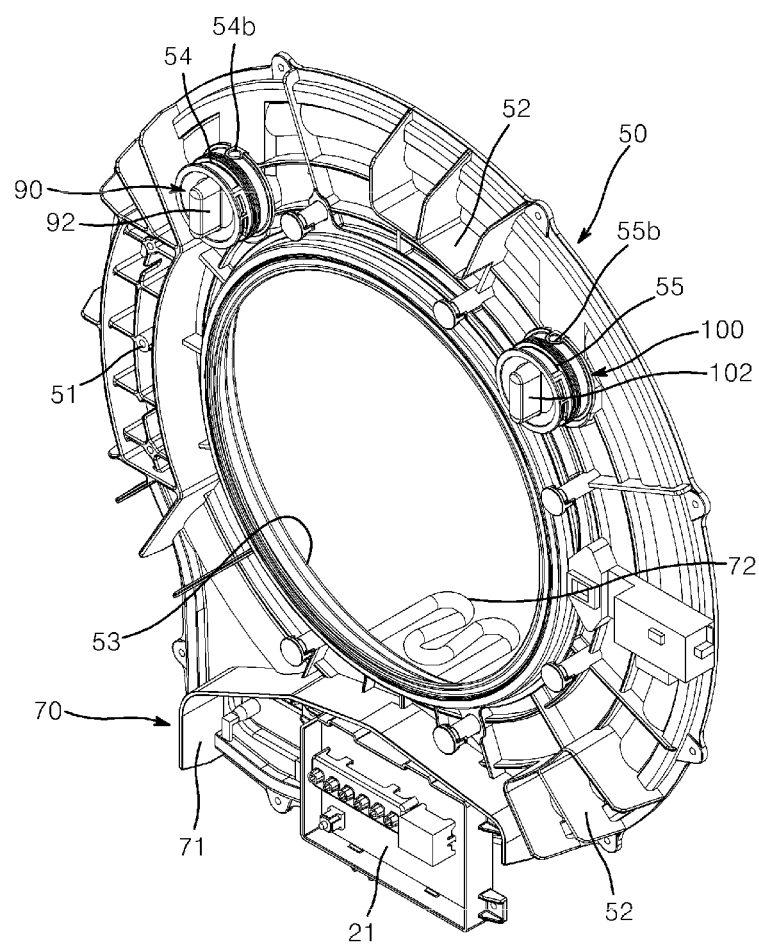
FIG. 17 is a perspective view of the front panel including the bypass unit of the wall-mounted drum washing machine in accordance with the embodiment of the present invention.

The cover unit 32 includes a door 1060 installed to open and close, and the front panel 50 includes a detergent box 90 and a conditioner box 100, which are detachably installed (refer to FIG. 17).

When a user wants to perform a washing operation, the user opens the door 60 from the cover unit 32 of the drum washing machine installed on the wall surface W, and puts laundry into the drum 23.

Then, the user separates the detergent box 90 and the conditioner box 100 mounted on the front panel 50, puts detergent and fabric conditioner into the detergent box 90 and the conditioner box 100, respectively, and then inserts the detergent box 90 and the conditioner box 100 into the front panel 50.

When the user closes the door 60 and operates a manipulation unit 21a, wash water is supplied into the tub 20 by the water supply device 74 or 74a, and power is applied to the driving unit 40. Then, the drum 23 is rotated to start the washing operation.

After the washing operation is completed, the wash water is discharged to the outside of the box unit 30 according to operation of the drain device 75.

In the present embodiment, since the small drum 23 having a weight of 2~4 kg is installed in the rear panel 10 mounted on the wall surface, baby clothes, underwear, and shirts, which need to be frequently washed, may be easily washed without a burden.

Thus, although a user has a small amount of laundry, the user may perform a washing operation without worrying about consuming wash water and electricity. That is, whenever a user has a small amount of laundry, the user may perform a washing operation without a burden.

Furthermore, the wall-mounted drum washing machine in accordance with the embodiment of the present invention includes a control block 22, a power line 11a, and a guide unit 12. The control block 22 is installed on the rear panel 10, the power line 11a is extended from the control block 22 to the outside of the rear panel 10, and the guide unit 12 is provided on the rear surface of the rear panel 10, guides the power line 11a to the outside of the rear panel 10, and fixes the power line 11a.

In the present embodiment, since the rear panel 10 includes the guide unit 12, the power line 11a may be extended in a side direction of the rear panel 10. Thus, the rear panel 10 may be easily mounted on the wall surface.

The power line 11a of the wall-mounted drum washing machine in accordance with the embodiment of the present invention is fixed along the guide unit 12 formed on the rear panel 10 so as to be extended in the circumferential direction of the rear panel 10, and exposed to the outside of the rear panel 10.

The power line 11a extended from the control block 22 is extended toward the guide unit 12 through the rear panel 10.

The rear panel 10 has a through-hole 11 through which the power line 11a passes, and the control block 22 is installed on a front surface 10a of the rear panel 10.

The power line 11a extended from the control block 22 is extended toward the rear surface of the rear panel 10 through the through-hole 11, and guided along the guide unit 12 provided on the rear surface of the rear panel 10 in the circumferential direction of the rear panel 10.

Thus, since the power line 11a is exposed to the outside toward the rear panel 10, a part of the power line 11a, exposed to the outside of the drum washing machine, is disposed adjacent to the wall surface W. Therefore, the power line 11a may be disposed to be closely attached to the wall surface W.

Since the power line 11a is extended to the rear surface of the rear panel 10 and then exposed to the outside at the top or bottom side of the rear panel 10, the exterior of the wall-mounted drum washing machine may be elegantly finished.

The guide unit 12 includes a fixing portion 12a which guides the power line 11a extended through the through-hole 11 to one side of the rear panel 10 and fixes the power line 11a.

The fixing portion 12a is formed on the rear surface of the rear panel 10, and fixes the power line 11a in a space between the rear panel 10 and the wall surface W.

Thus, the power line 11a extended to the rear surface of the rear panel 10 is not moved by vibrations generated during a washing operation, but fixed at a predetermined position.

The rear panel 10 includes a plurality of reinforcement ribs 13a formed on the rear surface thereof and a plurality of radial ribs 13 formed radially from the center of the rear panel.

The fixing portion 12a is formed by cutting a part of the radial rib 13. The plurality of radial ribs 13 are disposed at a predetermined interval from each other, thereby forming a space in which the power line 11a is disposed.

The rear panel 10 is formed in a substantially rectangular shape of which the corners are rounded. Furthermore, the rear panel 10 may be formed in various shapes such as circular shape or elliptical shape, and the present invention is not limited to the above-described shape of the rear panel 10.

Since the circumference of the rear panel 10 is bent toward the wall, a space is formed between the rear panel 10 and the wall (refer to FIG. 2).

As the space is formed, the plurality of reinforcement ribs 13c and radial ribs 13 may be formed on the rear surface of the rear panel 10 without interfering with the wall surface W.

Thus, since the strength of the rear panel 10 is reinforced by the reinforcement ribs 13c and the radial ribs 13, it is possible to prevent the rear panel 10 from being deformed or broken by vibrations generated by the rotations of the drum 23.

The through-hole 11 is formed at the bottom of the rear panel 10, and a plurality of fixing portions 12a formed by cutting the radial ribs 13 form a path through the power line 11a passes.

That is, the plurality of fixing portions 12a are successively formed so that the power line 11a may be extended to the top of the rear panel 10 while forming a curve close to a semicircular shape.

As the plurality of fixing portions 12a are arranged at a predetermined interval to the top of the rear panel 10, the power line 11a inserted into the fixing portions 12a may be guided from the bottom to the top of the rear panel 10.

Between the respective radial ribs 13, an installation hole portion 13a is formed, and a cable member 13b wound around the power line 11a is fixed to the installation hole portion 13a by a coupling member.

The cable member 13b may be formed of a wire which maintains a shape deformed by an external force or a material having a similar property.

Thus, when the power line 11a is surrounded by the cable member 13b and the cable member 13b is fixed to the installation hole portion 13a through the coupling member, it is possible to prevent the power line 11a from moving to the outside of the fixing portion 12a.

The rear panel 10 has a first through-groove 12b formed in the circumference thereof such that the power line 11a guided along the fixing portions 12a is exposed to the outside at the top of the rear panel 10.

Thus, the power line 11a is exposed to the outside at the top of the rear panel 10 through the first through-groove 12b.

The rear panel 10 has a second through-groove 12c formed in the bottom circumference thereof such that the power line 11a extended from the through-hole 11 is exposed to the outside at the bottom of the rear panel 10.

Thus, when the power line 11a is extended toward the bottom of the rear panel 10, the power line 11a is exposed to the outside of the rear panel 10 through the second through-groove 12c.

Figure 5:
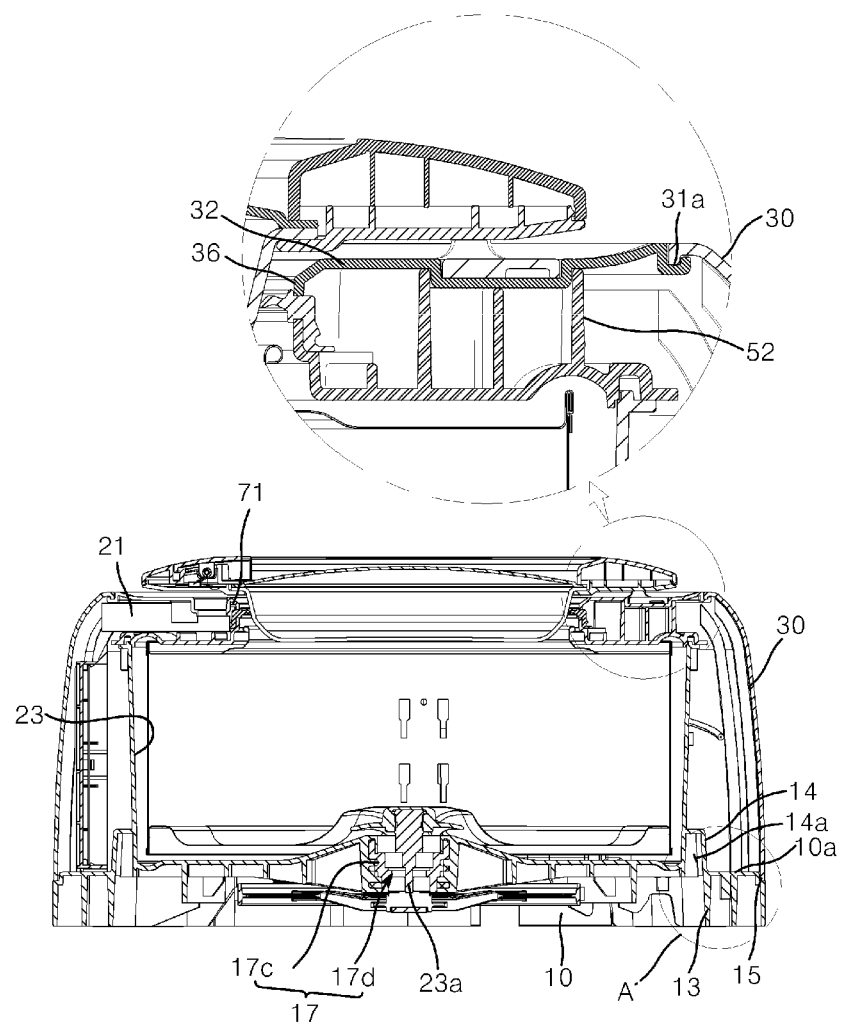
FIG. 5 is a cross-sectional view of the wall-mounted drum washing machine in accordance with the embodiment of the present invention.
Figure 6:
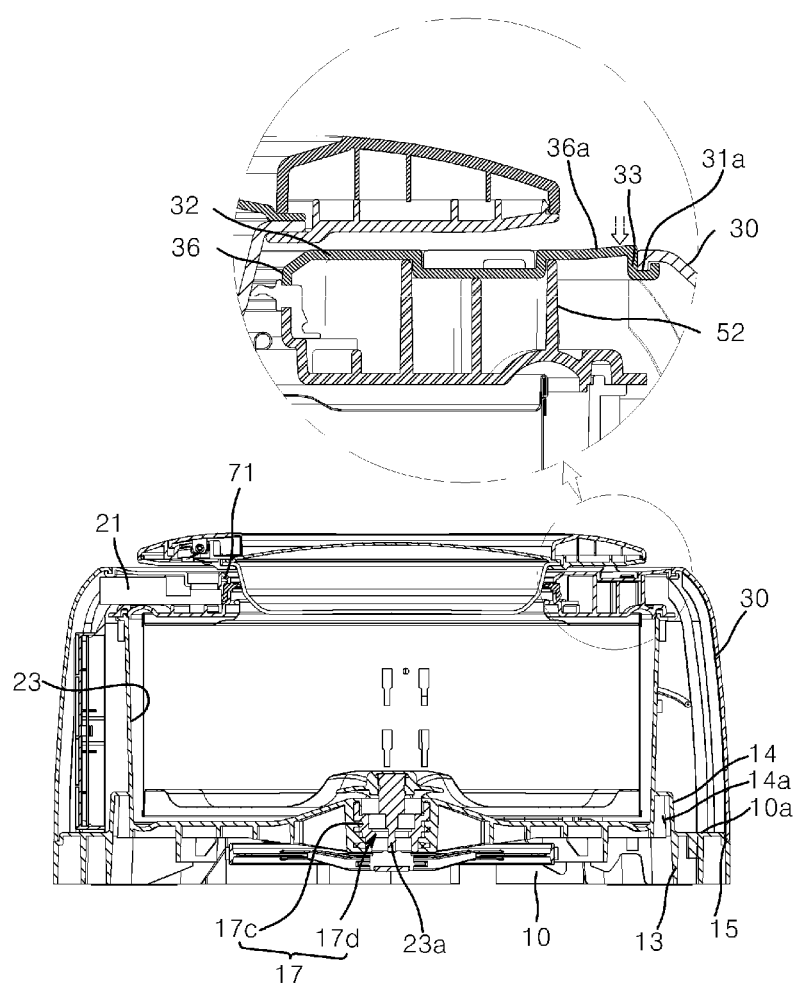
FIG. 6 is an operation state diagram illustrating an elastic assembly unit of the wall-mounted drum washing machine in accordance with the embodiment of the present invention.
Figure 7:
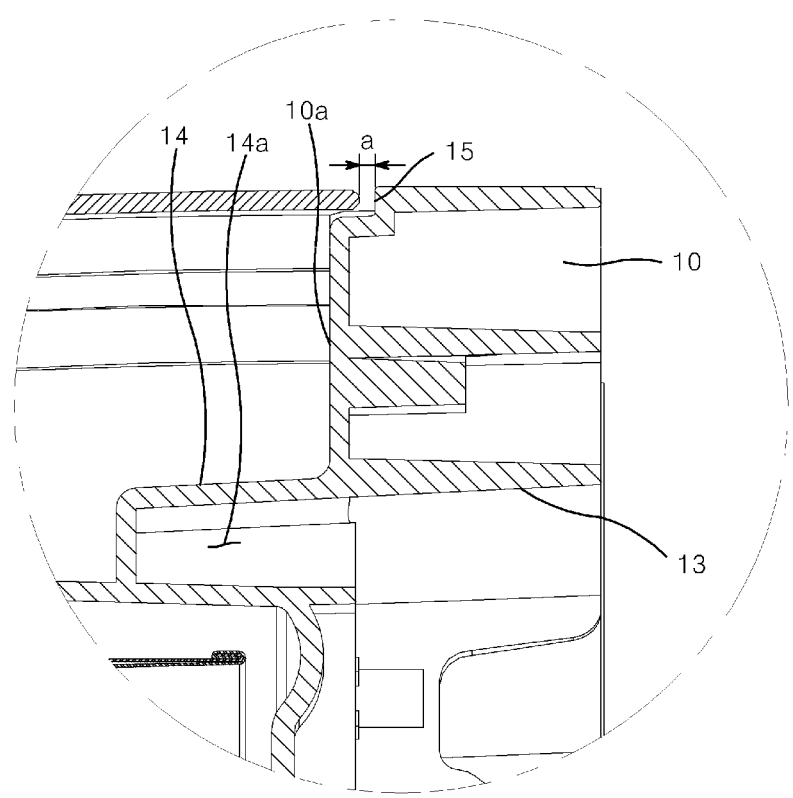
FIG. 7 is an expanded view of a portion A illustrated in FIG. 5.
Figure 8:
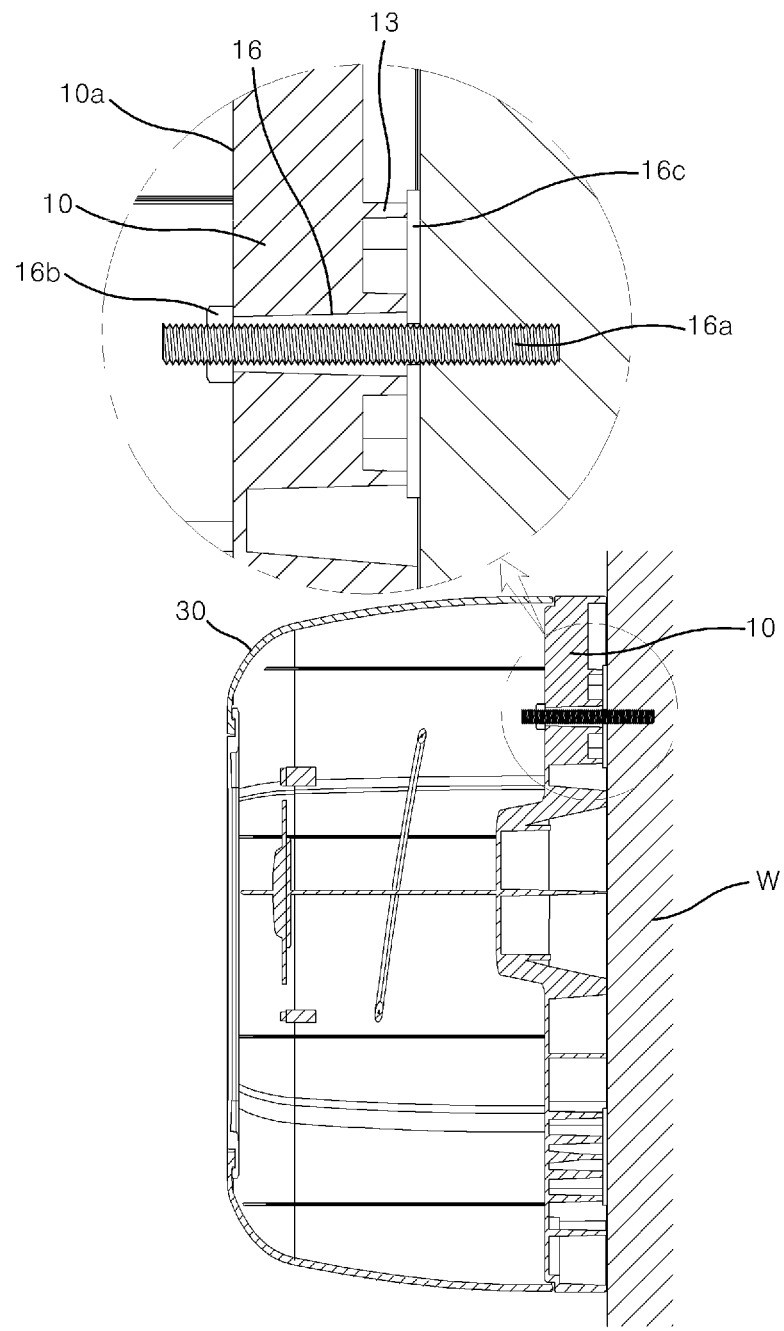
FIG. 8 is a cross-sectional view of a mounting structure of the wall-mounted drum washing machine in accordance with the embodiment of the present invention.

FIG. 5 is a cross-sectional view of the wall-mounted drum washing machine in accordance with the embodiment of the present invention. FIG. 6 is an operation state diagram illustrating an elastic assembly unit of the wall-mounted drum washing machine in accordance with the embodiment of the present invention. FIG. 7 is an expanded view of a portion A illustrated in FIG. 5. FIG. 8 is a cross-sectional view of a mounting structure of the wall-mounted drum washing machine in accordance with the embodiment of the present invention.

Referring to FIGS. 5 to 8, the wall-mounted drum washing machine in accordance with the embodiment of the present invention further includes a reinforcement unit 14 connecting the tub 20 and the rear panel 10 and surrounding the tub 20.

The rear panel 10 is formed in a panel shape and mounted on the wall surface W, and the cylindrical tub 20 is formed to protrude to the front side from the front surface 10a of the rear panel 10.

The reinforcement unit 14 formed at the connection between the tub 20 and the rear panel 11 surrounds an inner end portion of the tub 20 in a ring shape.

Since the reinforcement unit 14 surrounds the inner end portion of the tub 20, a load applied to the connection between the tub 20 and the rear panel 10 is distributed.

Thus, it is possible to prevent the inner end portion of the tub 20 from being deformed or broken.

Furthermore, since the plurality of radial ribs 13 and reinforcement ribs 13c are formed on the rear surface of the rear panel 10, the strength of the rear panel 10 is improved. Therefore, the rear panel 10 may be prevented from being deformed or broken.

Since the reinforcement unit 14 is integrated with the reinforcement ribs 13c, the reinforcement unit 14 may prevent the deformation of the inner end portion of the tub 20, and the reinforcement ribs 13c may prevent the deformation of the rear panel 10.

Thus, the strength of the connection between the tub 20 and the rear panel 10 is improved.

The tub 20 is formed to protrude to the front side from the rear panel 10, and the reinforcement ribs 13 are formed to protrude to the rear side from the rear panel 10.

Since the reinforcement unit 14 protrudes to the front side from the rear panel 10 and is integrally connected to the tub 20, the reinforcement unit 14 may surround the inner end portion of the tub 20, and connects the tub 20 and the rear panel 10 at a position protruding from the front surface 10a.

The top of the reinforcement unit 14 is bent to be integrally connected to the tub 20. As the top of the reinforcement unit 14 is bent, a space 14a is formed between the tub 20 and the bottom of the reinforcement unit 14.

Furthermore, a front end portion of the reinforcement unit 14 and the front surface 10a of the rear panel 10 form a stair shape.

Figure 11:
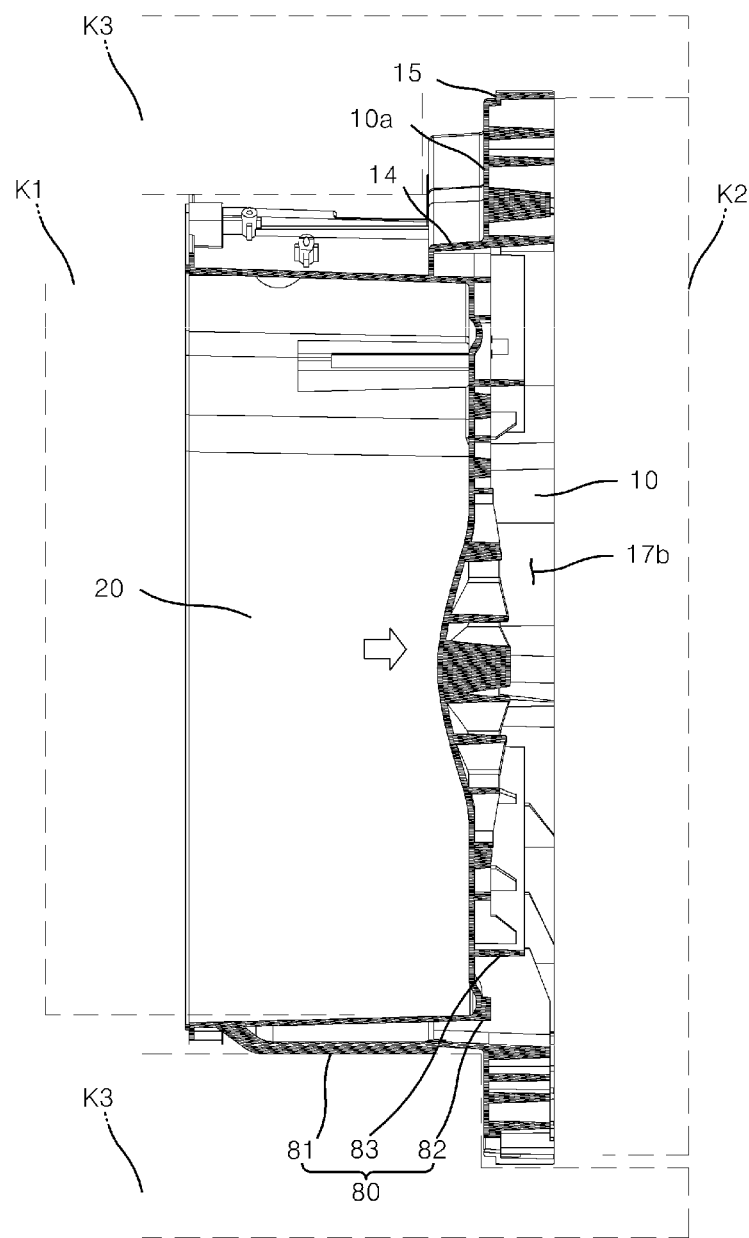
FIG. 11 is a cross-sectional view of the drain unit of the wall-mounted drum washing machine in accordance with the embodiment of the present invention.

Thus, the rear panel 10 having the tub 20 integrated therein may be manufactured through a first mold K1 disposed at the front surface 10a of the rear panel 10, a second mold K2 disposed at the rear surface of the rear panel 10, and a third mold K3 disposed at a side surface of the rear panel 10 and the tub 20 (refer to FIG. 11).

Through the above-described mold process, the rear panel 10, the tub 20, and the reinforcement unit 14 are integrally formed.

The rear panel 10 has a receiving portion 15 formed on the circumference thereof, to which the box unit 30 is coupled.

Thus, when the rear panel 10 and the box unit 30 are assembled to each other, an end portion of the box unit 30 may be precisely received on the receiving portion 15 formed on the circumference of the rear panel 10.

The receiving portion 15 is disposed at the rear side from the front surface 10a of the rear panel 10, and the reinforcement unit 14, the front surface 10a, and the receiving portion 15 are disposed to form a stair shape.

Therefore, when the box unit 30 and the rear panel 10 are assembled, the end portion of the box unit 30 may be precisely disposed on the receiving portion 15 through a step portion formed between the receiving portion 15 and the front surface 10a.

Furthermore, since the inner end portion of the tub 20 is surrounded by the reinforcement unit 14 protruding from the front surface 10a, the strength of the connection between the tub 20 and the rear panel 10 may be improved.

The reinforcement unit 14, the front surface 10a, and the receiving portion 15 form a stair shape protruding to the front side toward the reinforcement unit 14 from the receiving portion 15.

Therefore, after the rear panel 10 integrated with the tub 20 is completely manufactured, the mold disposed at the side of the rear panel 10 and the tub 20 may be easily separated.

Furthermore, since the reinforcement unit 14, the front surface 10*a*, and the receiving portion 15 form a stair shape protruding to the front side toward the tub 20, the reinforcement unit 14, the front surface 10*a*, and the receiving portion 15 are prevented from interfering with the mold for forming the stair shape, when the mold is retreated toward the outside.

The rear panel 10 has a through-hole 16 into which a coupling member 16*a* is inserted to be coupled to the wall surface W, and a buffer member 16*c* is interposed between the through-hole 16 and the wall surface W.

The front side of the rear panel 10 has a rectangular shape or a similar shape to the rectangular shape, and the rear panel 10 includes a plurality of through-holes 16 formed at four corners thereof, respectively (refer to FIG. 8).

The plurality of radial ribs 13 and reinforcement ribs 13*c* are formed on the rear surface of the rear panel 10 having the through-holes 16 formed therein.

The radial ribs 13 are successively formed to be spaced at a predetermined interval from the through-holes 16, and the reinforcement ribs 13*c* are formed to connect the respective radial ribs 13.

The coupling member 16*a* is inserted into the through-hole 16 so as to be coupled to the wall surface W, and a nut member 16*b* to be coupled to the coupling member 16*a* is closely attached to the front surface 10*a* of the rear panel 10.

The vibrations generated during the washing operation are transmitted by the nut member 16*b* which closely attaches the coupling member 16*a* to the rear panel 10.

In the wall-mounted drum washing machine in accordance with the embodiment of the present invention, since the nut member 16*b* is positioned on the front surface 10*a*, a gap is formed between the nut member 16*b* and the wall surface W, and the reinforcement ribs 13 and the buffer member 16*c* are interposed in the gap so as to suppress the vibrations of the drum 23 from being transmitted to the wall surface W.

Figure 9:
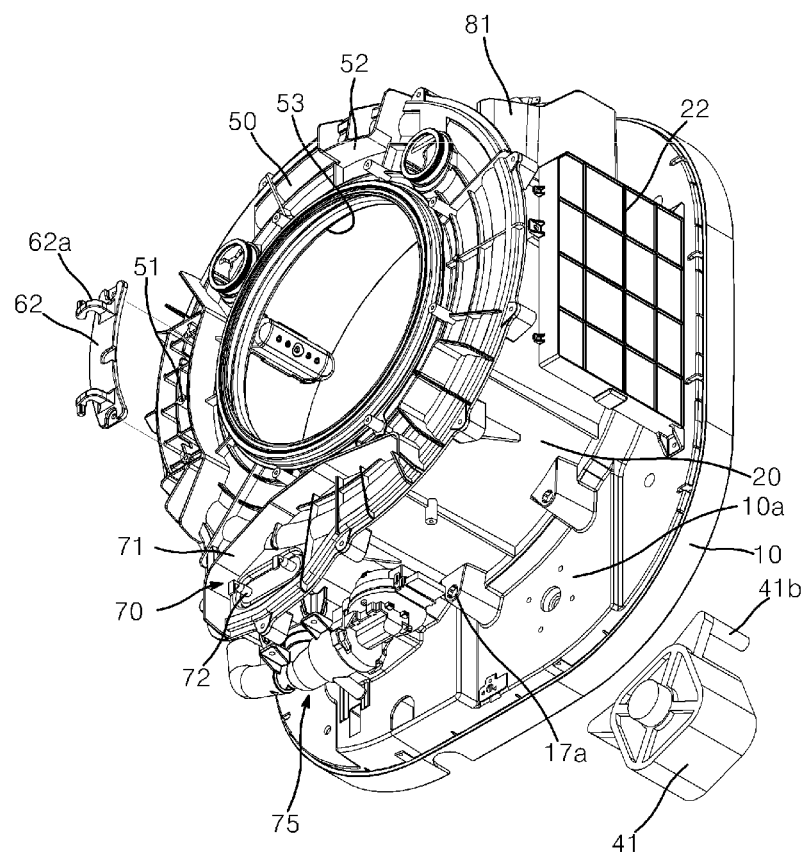
FIG. 9 is a perspective view of a front panel mounting structure of the wall-mounted drum washing machine in accordance with the embodiment of the present invention.
Figure 10:
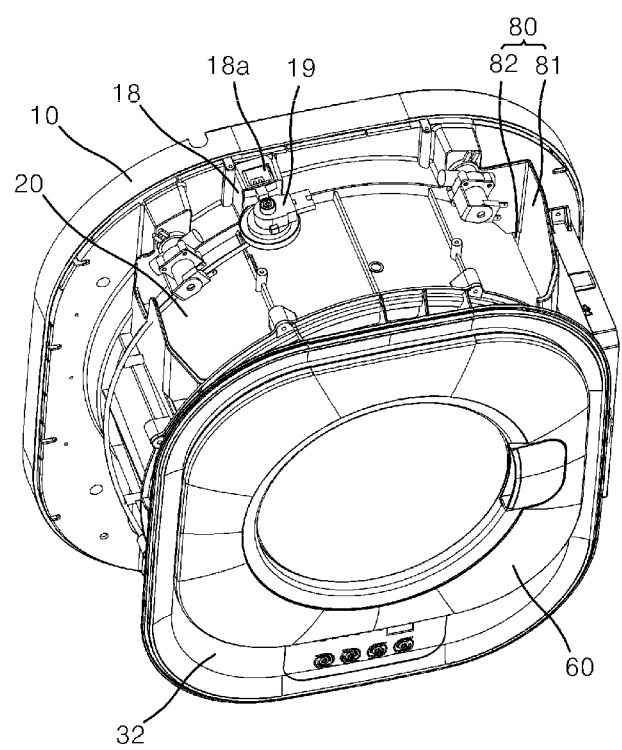
FIG. 10 is a perspective view of a water level sensor mounting structure and a drain unit of the wall-mounted drum washing machine in accordance with the embodiment of the present invention.
Figure 12:
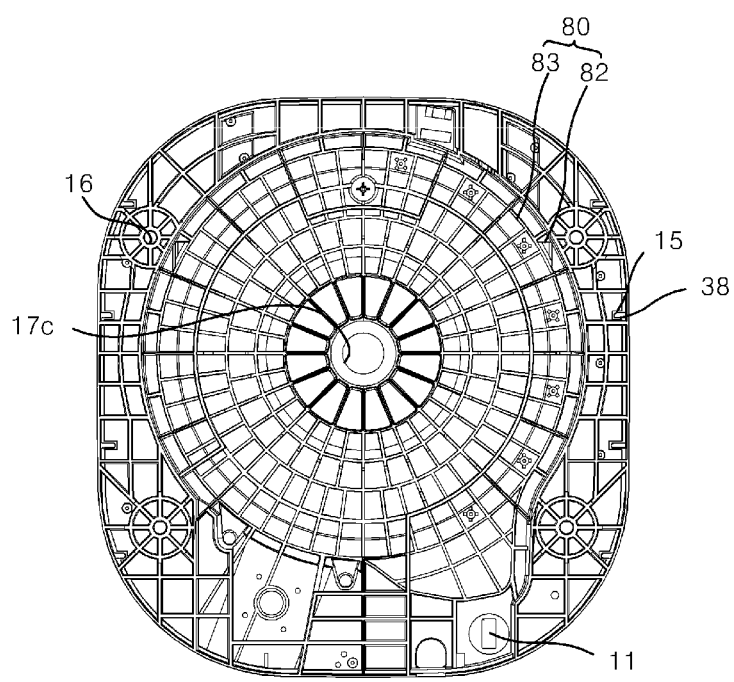
FIG. 12 is a rear view of a rear panel of the wall-mounted drum washing machine in accordance with the embodiment of the present invention.

FIG. 9 is a perspective view of a front panel mounting structure of the wall-mounted drum washing machine in accordance with the embodiment of the present invention. FIG. 10 is a perspective view of a water level sensor mounting structure and a drain unit of the wall-mounted drum washing machine in accordance with the embodiment of the present invention. FIG. 11 is a cross-sectional view of the drain unit of the wall-mounted drum washing machine in accordance with the embodiment of the present invention. FIG. 12 is a rear view of the rear panel of the wall-mounted drum washing machine in accordance with the embodiment of the present invention.

Referring to FIGS. 9 to 12, the wall-mounted drum washing machine in accordance with the embodiment of the present invention further includes a coupling unit 17 (refer to FIG. 5) and a disposition portion 17*b*. The coupling unit 17 is provided in the rear panel 10 such that a driving shaft 23*a* of the drum 23 is rotatably installed. The disposition portion 17*b* serves to prevent the driving unit 40 (refer to FIG. 2) connected to the driving shaft 23*a* from interfering with the wall surface W.

Since the coupling unit 17 is provided in the center of the rear panel 10 and connects the driving unit 40 to the drum 23 installed in the tub 20, the power provided by the driving unit 40 is transmitted to the drum 23.

The disposition portion 17*b* is formed by concaving the rear surface of the rear panel 10 to the front side. Since the driving unit 40 is positioned inside the disposition portion 17*b*, a driving wheel 42 rotated by the operation of the driving unit 40 is prevented from interfering with the rear panel 10 and the wall surface W.

The driving unit 40 includes a motor 41 to provide power to rotate the drum 23, the driving wheel 42 connected to the driving shaft 23*a*, and a belt 43 to transmit the power of the motor 41 to the driving wheel 42.

The motor 41 is installed on the front surface 10*a* of the rear panel 10, and has a rotating shaft 41*a* extended to the rear surface of the rear panel 10 through the rear panel 10.

The driving wheel 42 is positioned inside the disposition portion 17*b* provided at the rear surface of the rear panel 10, and connected to the driving shaft 23*a*.

The belt 43 is installed to interconnect the rotating shaft 41*a* of the motor 41*a* and the driving wheel 42.

Thus, when the power of the motor 41 is transmitted to the driving wheel 42 by the belt 43 so as to rotate the driving wheel 42, the drum 23 connected to the driving shaft 23*a* is rotated to perform a washing operation.

The coupling unit 17 (refer to FIG. 5) includes a rotation hole 17*c* formed in the rear panel 10 and a bearing 17*d* installed in the rotation hole 17*c* so as to rotatably support the driving shaft 23*a*.

The driving shaft 23*a* is rotatably installed in the rear panel 10 through the bearing 17*d* installed in the rotation hole 17*c*.

The drum 23 is installed at the front end of the driving shaft 23*a*, and the driving wheel 42 is installed at the rear end of the driving shaft 23*a*.

The disposition portion 17*b* is formed by concaving the rear surface of the rear panel 10 to the front side such that the driving unit 40 is disposed in the disposition portion 17*b*.

Specifically, the disposition portion 17*b* is formed by concaving the central portion of the rear panel 10, where the driving wheel 42 is positioned, to the front side.

Thus, the driving wheel 42 positioned in the disposition portion 17*b* may be rotated so as not to interfere with the rear panel 10 and the wall surface W.

The motor 41 may be positioned on the rear surface of the rear panel 10 so as to be directly connected to the driving shaft 23*a*. That is, a direct connection-type motor may be installed, instead of the driving unit 40 described in the present embodiment of the present invention.

This structure may be easily understood by those skilled in the art to which the present invention pertains, and thus the detailed descriptions of other embodiments are omitted herein.

The motor 41 has a pair of fixing hole portions 41*b* formed therein, and the rear panel 10 has a pair of boss portions 17*a* formed to protrude to the front side. The fixing hole portions 41*b* are inserted into the boss portions 17*a*.

The fixing hole portions 41*b* protrude from both side surfaces of the motor 41 in the side direction, and are then bent in the downward direction.

The boss portions 17*a* protrude to the front side from the front surface 10*a* of the rear panel 10, and the fixing hole portions 41*b* are inserted into the boss portions 17*a*.

Thus, when the fixing holes 41*b* of the motor 41 are inserted into the boss portions 17*a*, the motor 41 is primarily assembled at a precise position.

The motor 41 is installed at the bottom of the front surface 10*a* of the rear panel 10, and disposed between the pair of boss portions 17*a* so as to be primarily assembled. Then, the motor 41 and the front surface 10*a* are coupled through a coupling member.

The motor 41 is primarily coupled to the rear panel 10 by the fixing hole portions 41*b* and the boss portions 17*a*, and secondarily coupled to the rear panel 10 by the separate coupling member 16*a*.

Therefore, it is possible to prevent a gap from being formed between the motor 41 and the rear panel 10 due to the vibrations generated when the motor 41 is driven.

Furthermore, the coupling member may be inserted into the fixing hole portions 41*b*, thereby further increasing the coupling force between the fixing hole portions 41*b* and the boss portions 17*a*.

The rear panel 10 includes a protrusion 18 installed thereon, where the water level sensor 19 is installed. The protrusion 18 has an attachment/detachment hole 18*a* for separating the water level sensor 19.

The water level sensor 19 is a pressure sensor installed in a separate pipe diverging from a drain pipe connected to the bottom of the tub 20.

The water level sensor 19 serves to sense the internal pressure of the tub 20 and determine the amount of wash water contained in the tub 20.

The water level sensor 19 is disposed at the top of the tub 20, and installed on the protrusion 18 protruding to the front side from the rear panel 10.

The protrusion 18 protrudes to the front side from the rear panel 10, the attachment/detachment hole 18*a* is formed on the top surface of the protrusion 18, and the water level sensor 19 is installed on the front surface of the protrusion 18.

The water level sensor 19 has a hook formed thereon. When the hook is inserted through the front surface of the protrusion 18, the hook is inserted into the protrusion 18, and the water level sensor 19 is mounted.

When the water level sensor 19 needs to be replaced because of a long-term washing operation, an operator inserts a tool into the attachment/detachment hole 18*a* to push the hook to the outside of the protrusion 18. Then, the water level sensor 19 may be easily separated.

The front panel 50 having the opening 53 formed therein is installed on the tub 20, and a hinge portion 62 to connect the door 60 which opens/closes the opening 53 is supported by the front panel 50.

The hinge portion 62 is formed at one side of the opening 53 and has a curved panel shape extended in a vertical direction, and supports 62*a* protruding from the upper and lower parts of the hinge portion 62 are rotatably connected to the upper and lower parts of the door 60.

The rear panel 10 includes the box unit 30 to surround the tub 20, and the box unit 30 includes the cover unit 32 to cover the front panel 50.

Figure 13:
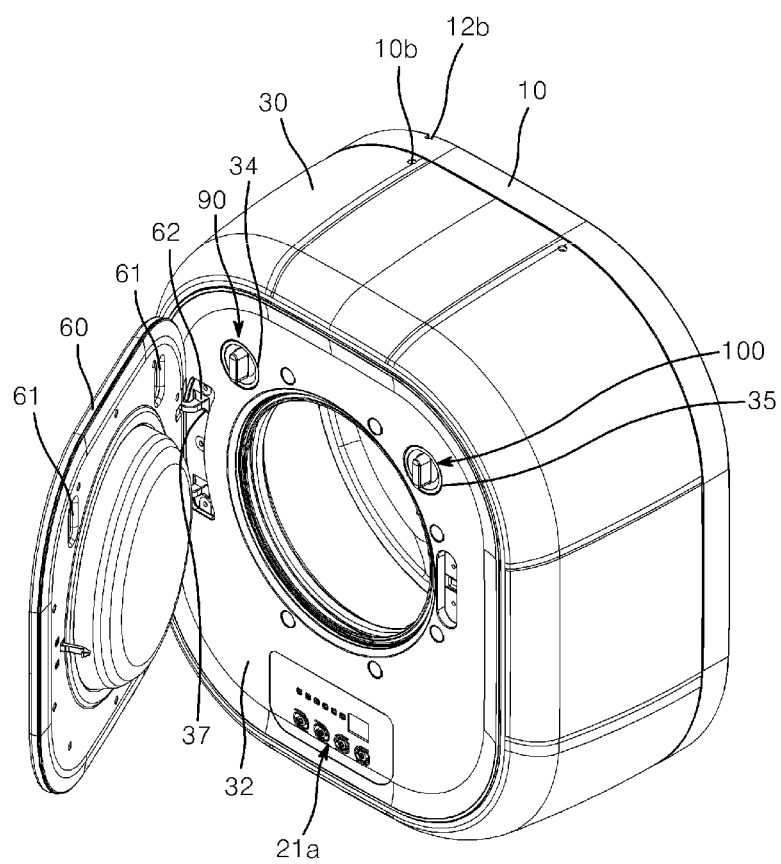
FIG. 13 is a perspective view illustrating a state in which a door of the wall-mounted drum washing machine in accordance with the embodiment of the present invention is opened.

The hinge portion 62 connected to the door 60 is supported by the coupling member coupled to the front panel 50 through the cover unit 32 (refer to FIG. 13).

The front panel 50 has a larger thickness than the cover unit 32, and includes a plurality of reinforcement ribs formed on the front surface thereof. Thus, a support force to support the door 60 may be improved.

Figure 14:
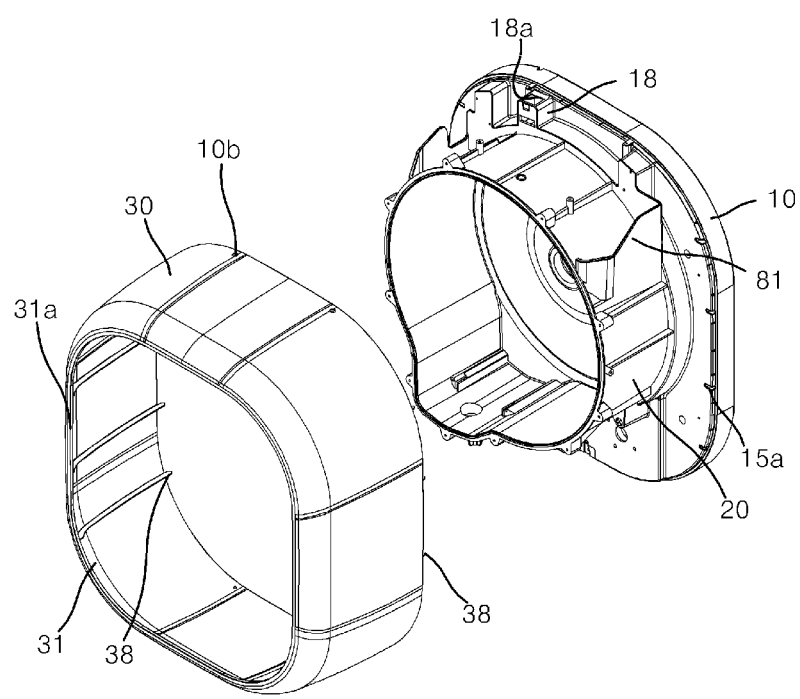
FIG. 14 is an exploded view of a box unit mounting structure of the wall-mounted drum washing machine in accordance with the embodiment of the present invention.
Figure 15:
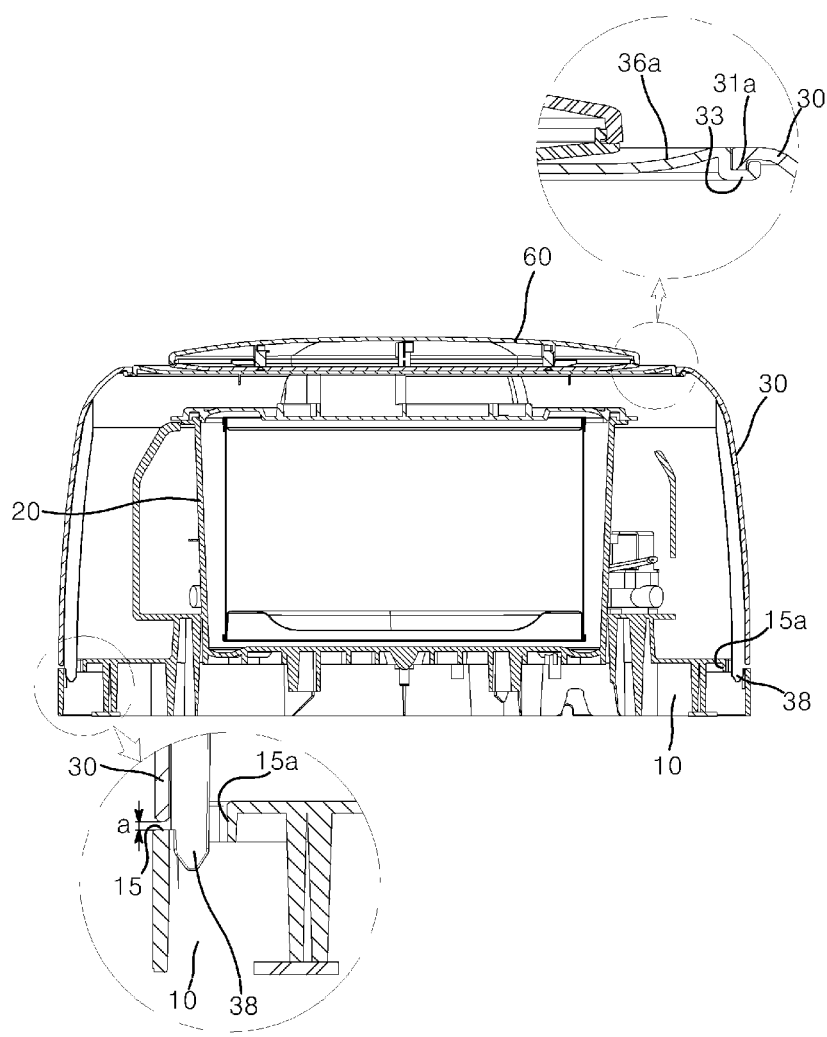
FIG. 15 is a cross-sectional view of a connection structure between guide protrusions and guide grooves of the wall-mounted drum washing machine in accordance with the embodiment of the present invention.

FIG. 13 is a perspective view illustrating a state in which the door of the wall-mounted drum washing machine in accordance with the embodiment of the present invention is opened. FIG. 14 is an exploded view of a box unit mounting structure of the wall-mounted drum washing machine in accordance with the embodiment of the present invention. FIG. 15 is a cross-sectional view of a connection structure between guide protrusions and guide grooves of the wall-mounted drum washing machine in accordance with the embodiment of the present invention.

Figure 16:
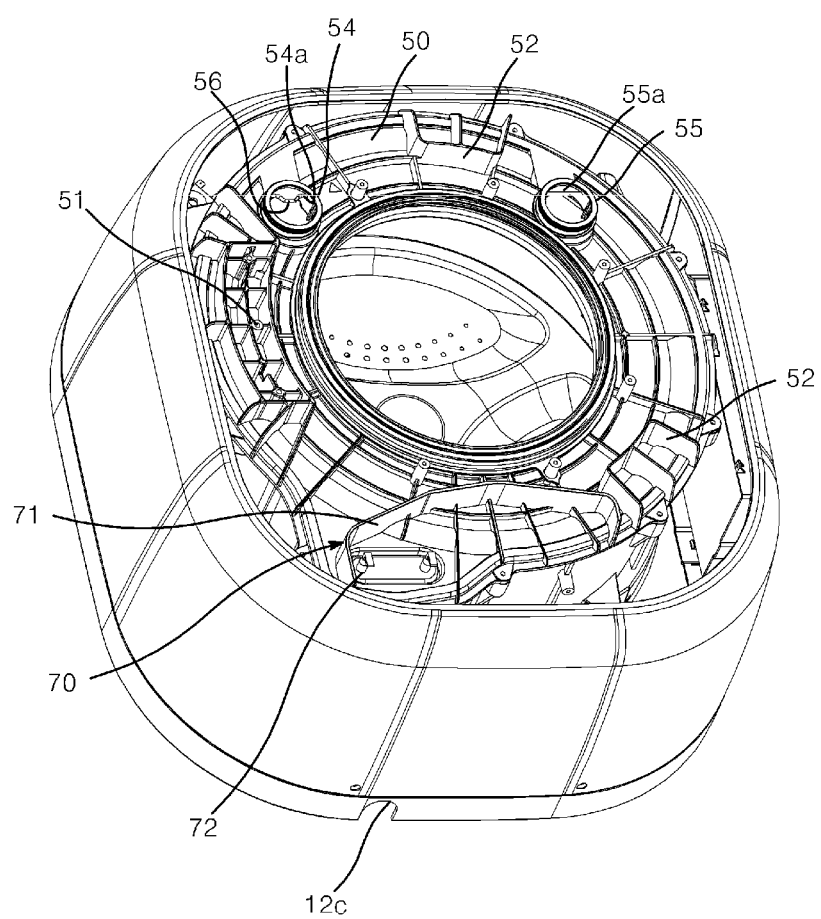
FIG. 16 is a perspective view of a bypass unit of the wall-mounted drum washing machine in accordance with the embodiment of the present invention.

FIG. 16 is a perspective view of a bypass unit of the wall-mounted drum washing machine in accordance with the embodiment of the present invention. FIG. 17 is a perspective view of the front panel including the bypass unit of the wall-mounted drum washing machine in accordance with the embodiment of the present invention.

Referring to FIGS. 13 to 17, the wall-mounted drum washing machine in accordance with the embodiment of the present invention further includes a control unit 21 installed on the front panel 50 and a bypass unit 70 to bypass wash water dropping toward the control unit 21.

The control unit 21 is installed at the bottom of the front surface of the front panel 50 so as to be connected to the manipulation unit 21*a* installed on the cover unit 32.

The bypass unit 70 is disposed over the control unit 21. Thus, the wash water flowing downward along the tub 20 drops in the side directions of the tub 20 along the bypass unit 70.

Therefore, it is possible to prevent a malfunction and damage of the drum washing machine, which may occur when water is introduced into the control unit 21.

The bypass unit 70 includes a bypass rib 71 disposed between the control unit 21 and the opening 53.

The wash water flowing downward along the tub 20 is guided toward the edge of the tub 20 along the bypass rib 71, which makes it possible to prevent the wash water from dropping toward the control unit 21.

The bypass rib 71 is formed to be elongated in the side-to-side direction, and both ends of the bypass rib 71 are bent while forming a curved surface in the downward direction.

Therefore, the wash water dropping onto the top surface of the bypass rib 71 flows toward both ends of the bypass rib 71.

Inside the bypass rib 71, a heater 72 is installed to heat wash water.

The heater 72 which receives power to heat wash water contained in the tub 20 is connected to an electric device. The electric device of the heater 72 is not contacted with wash water because of the bypass rib 71.

The water supply device 74 and 74*a* (refer to FIG. 3) is connected to the top of the rear panel 10, and the rear panel 10 includes the drain unit 80 (refer to FIGS. 9 and 10) which prevents wash water dropping from the water supply device 74 and 74*a* from flowing toward the control unit 21.

The water supply device 74 and 74*a* includes a plurality of water supply valves 74 (refer to FIG. 3) installed in the rear panel 10 and a water supply pipe 74*a* connecting the water supply valves 74 to the tub 20 and connecting the water supply valves 74 to a water supply source.

The water supply pipe 74*a* is inserted into the rear surface of the rear panel 10 through the second through-groove 12*c* (refer to FIG. 2) formed at the bottom of the rear panel 10, and extended to the top of the rear panel 10 along the circumferential surface of the tub 20 so as to be connected to the water supply valves 74.

When the water supply valve 74 malfunctions or is broken, wash water supplied along the water supply pipe 74*a* may flow downward along the circumferential surface of the tub 20.

In the wall-mounted drum washing machine in accordance with the embodiment of the present invention, the drain unit 80 discharges the wash water flowing toward the bottom of the tub 20 to the outside of the rear panel 10.

The drain unit 80 includes a blocking rib 81, a drain hole 82, and a guide rib 83. The blocking rib 81 protrudes from the tub 20. The drain hole 82 is formed in the rear panel 10 so as to face the blocking rib 81. The guide rib 83 guides wash water flowing through the drain hole 82 toward the circumference of the rear panel 10.

The blocking rib 81 is formed in a funnel shape over both sides of the tub 20, and integrated with the circumferential surface of the tub 20.

Thus, the wash water flowing along the tub 20 is contained in the blocking rib 81.

The drain hole 82 is formed at the bottom of the funnel-shaped space formed by the blocking rib 81 and the circumferential surface of the tub 20, and formed through the rear panel 10 such that the front surface 10*a* and the rear surface of the rear panel 10 communicate with each other.

Therefore, the wash water flowing along the circumferential surface of the tub 20 from the water supply valves 74 is collected by the blocking rib 81, and moved toward the rear surface of the rear panel 10 through the drain hole 82.

The guide rib 83 is formed in a ring shape on the rear surface of the rear panel 10, and the drain hole 82 is disposed outside the guide rib 83 and formed through the front and rear surfaces of the rear panel 10.

The wash water flowing along the circumferential surface of the tub 20 is collected by the blocking rib 81, moves toward the rear surface of the rear panel 10 along the drain hole 82, and then moves toward the circumference of the rear panel 10 along the guide rib 83. Then, the wash water drops downward.

The wall-mounted drum washing machine in accordance with the embodiment of the present invention further includes an elastic assembly unit 39 (refer to FIG. 3) which connects the box unit 30 and the rear panel 10 such that an elastic force is generated between the cover unit 32 and the box unit 30.

The box unit 30 and the cover unit 32 form the outer wall of the wall-mounted drum washing machine, and provide an elastic force to each other.

Therefore, the box unit 30 and the cover unit 32 are assembled by applying an external force in a reverse direction of the elastic force generated by the box unit 30 and the cover unit 32.

Even after the box unit 30 and the cover unit 32 are assembled, an elastic force to restore the box unit 30 and the cover unit 32 to the original state still exists.

Thus, the coupling force among the box unit 30, the cover unit 32, and the rear panel 10 is improved by the elastic force.

The elastic assembly unit 39 includes a ring portion 31*a*, a lock groove portion 33, and the receiving portion 15. The ring portion 31*a* is formed in the connection hole 31. The lock groove portion 33 is formed in the cover unit 32 such that the ring portion 31*a* is inserted into the lock groove portion 33. The receiving portion 15 is formed in the rear panel 10 so as to receive the box unit 30.

The box unit 30 has the connection hole 31 formed at the front side thereof, and the cover unit 32 is installed in the connection hole 31. The ring portion 31*a* formed in the connection hole 31 is inserted into the lock groove portion 33 formed on the circumference of the cover unit 32.

The receiving portion 15 is disposed at the rear side from the end of the box unit 30 such that a gap (a) is formed between the end of the box unit 30 and the receiving portion 15 when the box unit 30 having the cover unit 32 assembled thereto is received on the rear panel 10 (refer to FIG. 7).

Therefore, when the box unit 30 and the cover unit 32 are received on the rear panel 10 having the front panel 50 installed thereon after the box unit 30 and the cover unit 32 are assembled, the end of the box unit 30 is disposed with the gap (a) from the receiving portion 15.

When the box unit 30 and the rear panel 10 are assembled, an operator presses the front surface of the box unit 30 toward the receiving portion 15 such that the end of the box unit 30 is closely attached to the receiving portion 15 while the cover unit 32 and the box unit 30 are deformed. Then, the box unit 30 and the rear panel 10 are coupled to each other.

The box unit 30 and the rear panel 10 have a plurality of assembling holes 10*b* formed at the top and bottom thereof and coupled to the coupling members. Specifically, two assembling holes 10*b* are formed at the top, and two assembling holes 10*b* are formed at the bottom.

Thus, even after the box unit 30 is completely assembled, the coupling members are not exposed to the front surface of the cover unit 32 and the box unit 30.

The receiving portion 15 has guide grooves 15*a* formed therein, and the box unit 30 has guide protrusions 38 formed to be inserted into the guide grooves 15*a*.

Therefore, when the box unit 30 is received on the receiving portion 15, the box unit 30 may be disposed in such a manner that the guide protrusions 38 are inserted into the guide grooves 15*a*. Then, the box unit 30 may be assembled at a precise position of the rear panel 10.

The cover unit 32 includes a mounting hole 36 and a curved surface portion 36*a*. The door 60 is installed in the mounting hole 36, and the curved surface portion 36*a* is inclined to the outside of the box unit 30 from the mounting hole 36 toward the lock groove portion 33 (refer to FIG. 5).

The circumference of the cover unit 32 has a shape to protrude to the front side, due to the curved surface portion 36*a*.

Therefore, when the box unit 30 is pressurized toward the receiving portion 15 in a state where the cover unit 32 and the box unit 30 are coupled to each other, the end of the box unit 30 is moved toward the receiving portion 15 while the curved surface portion 36*a* is straightened.

The cover unit 32 includes a mounting groove 37 formed between the mounting hole 36 and the curved surface portion 36*a*, and the hinge portion 62 of the door 60 passes through the mounting groove 37.

After the hinge portion 62 is received in the mounting groove 37, the coupling member is coupled to the front panel 50 through the hinge portion 62 and the mounting groove 37.

Therefore, although the hinge portion 62 seems to be coupled to the cover unit 32, the hinge portion 62 is supported by the front panel 50.

The front panel 50 includes first and second supports 51 and 52 integrated therein. The first support 51 is coupled to the hinge portion 62, and the second support 52 supports the cover unit 32.

The coupling member passing through the hinge portion 62 and the mounting groove 37 is coupled to the first support portion 51.

When the cover unit 32 and the box unit 30 are pressurized toward the receiving portion 15, the second support 52 serves as a lever. Therefore, as the curved surface portion 36*a* of the cover unit 32 is straightened, the end of the box unit 30 is moved toward the receiving portion 15.

Figure 18:
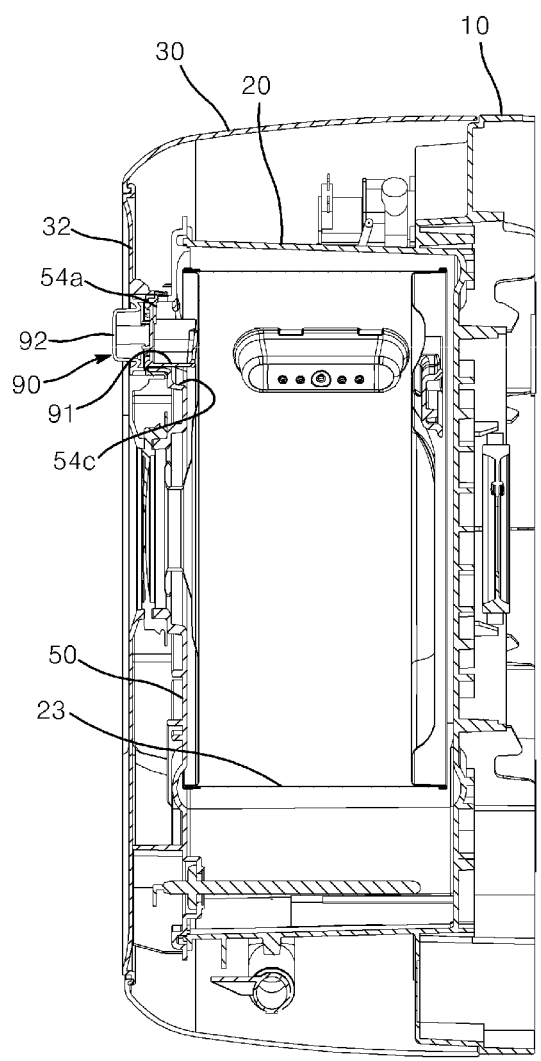
FIG. 18 is a cross-sectional view of a detergent box mounting structure of the wall-mounted drum washing machine in accordance with the embodiment of the present invention.
Figure 19:
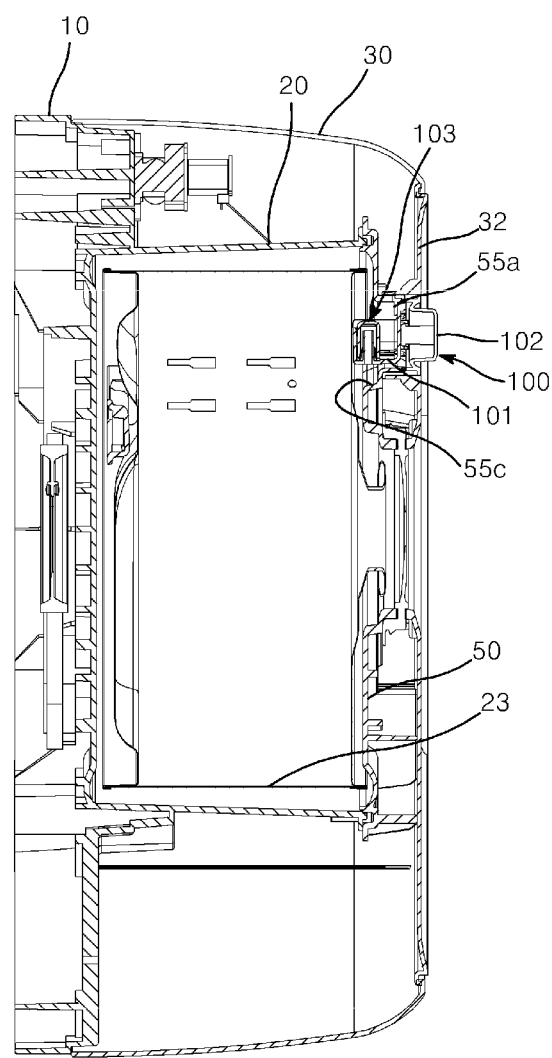
FIG. 19 is a cross-sectional view of a conditioner box mounting structure of the wall-mounted drum washing machine in accordance with the embodiment of the present invention.
Figure 20:
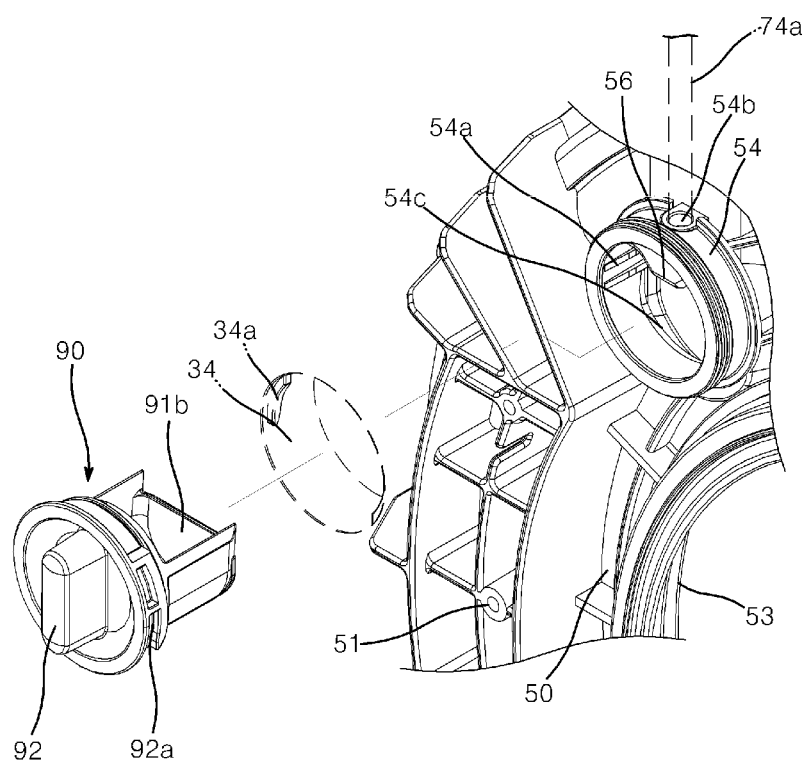
FIG. 20 is an exploded perspective view of the detergent box mounting structure of the wall-mounted drum washing machine in accordance with the embodiment of the present invention.
Figure 21:
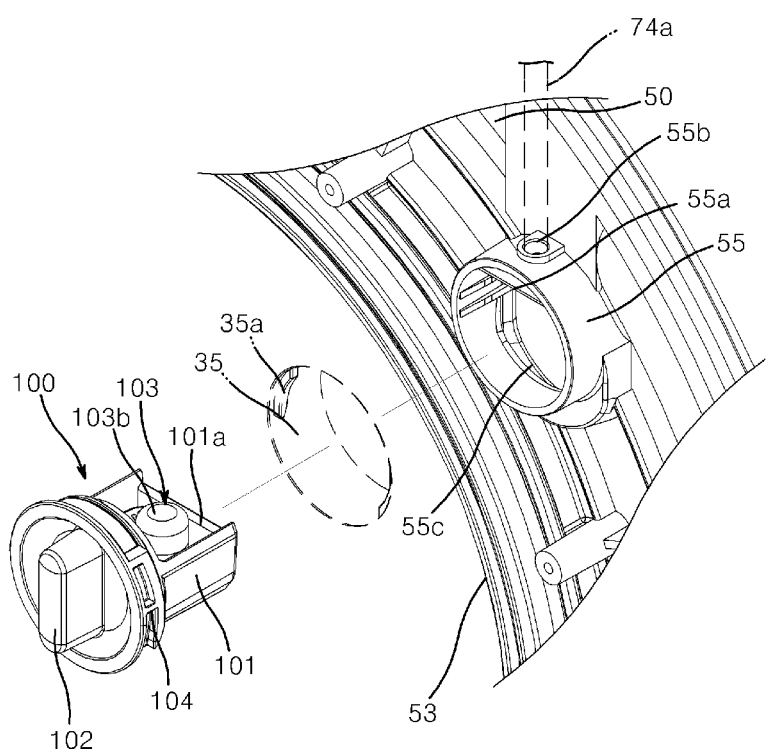
FIG. 21 is an exploded perspective view of the conditioner box mounting structure of the wall-mounted drum washing machine in accordance with the embodiment of the present invention.

FIG. 18 is a cross-sectional view of a detergent box mounting structure of the wall-mounted drum washing machine in accordance with the embodiment of the present invention. FIG. 19 is a cross-sectional view of a conditioner box mounting structure of the wall-mounted drum washing machine in accordance with the embodiment of the present invention. FIG. 20 is an exploded perspective view of the detergent box mounting structure of the wall-mounted drum washing machine in accordance with the embodiment of the present invention. FIG. 21 is an exploded perspective view of the conditioner box mounting structure of the wall-mounted drum washing machine in accordance with the embodiment of the present invention.

Figure 22:
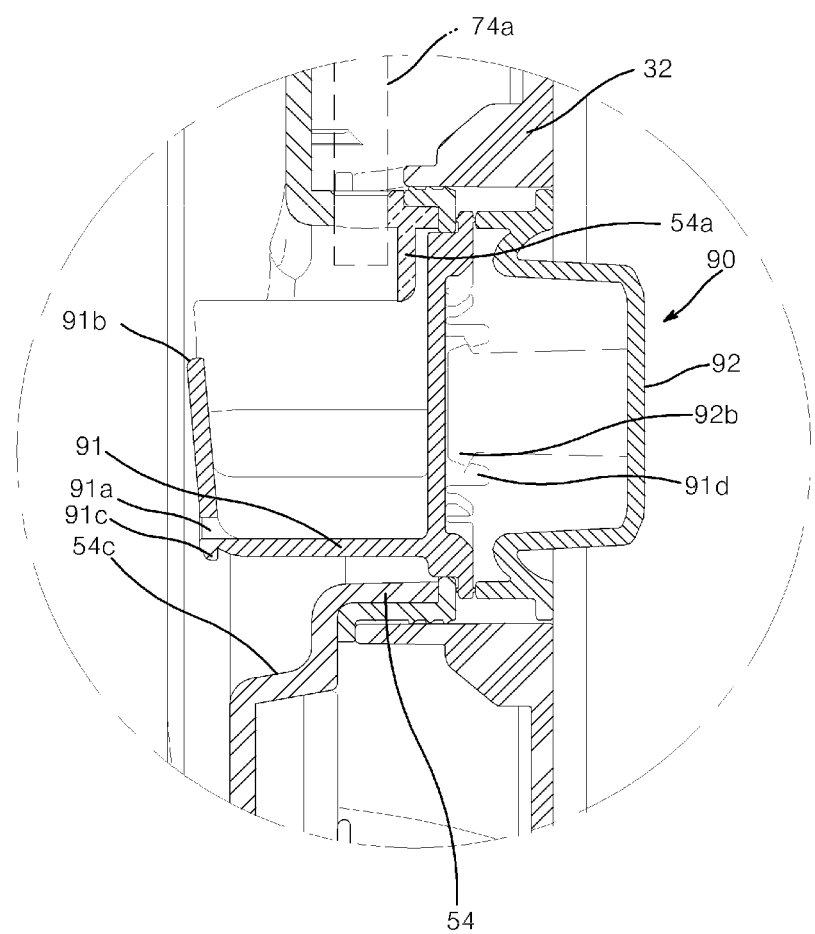
FIG. 22 is an expanded cross-sectional view of the detergent box mounting structure of the wall-mounted drum washing machine in accordance with the embodiment of the present invention
Figure 23:
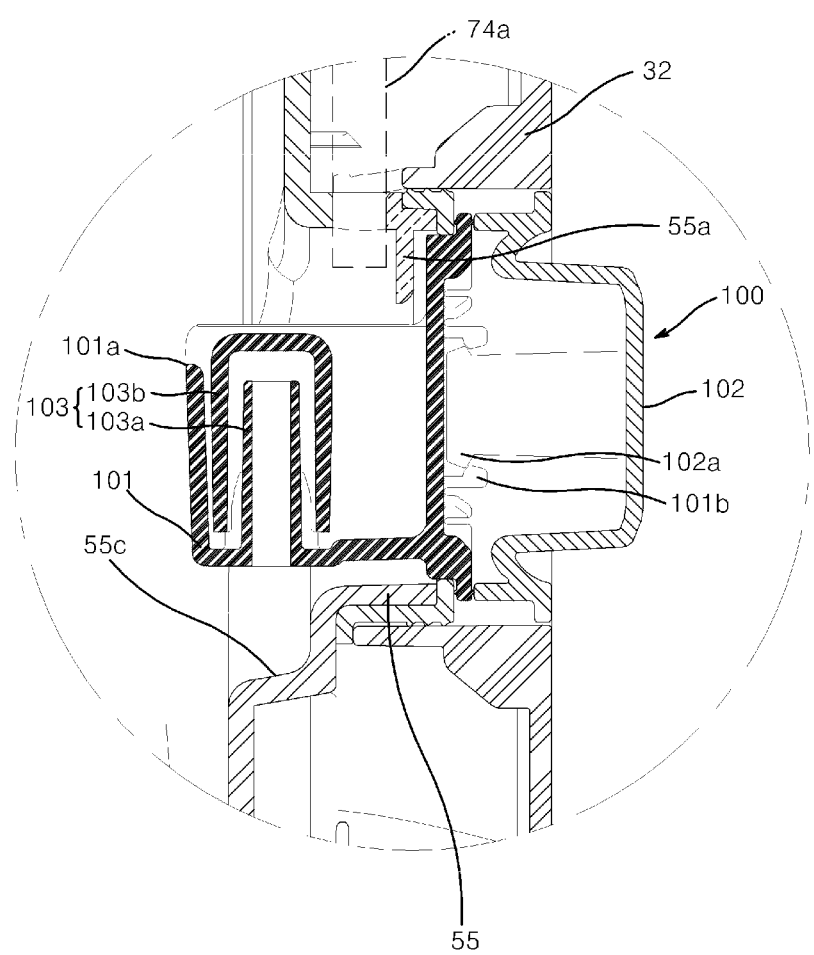
FIG. 23 is an expanded cross-sectional view of the conditioner box mounting structure of the wall-mounted drum washing machine in accordance with the embodiment of the present invention.
Figure 24:
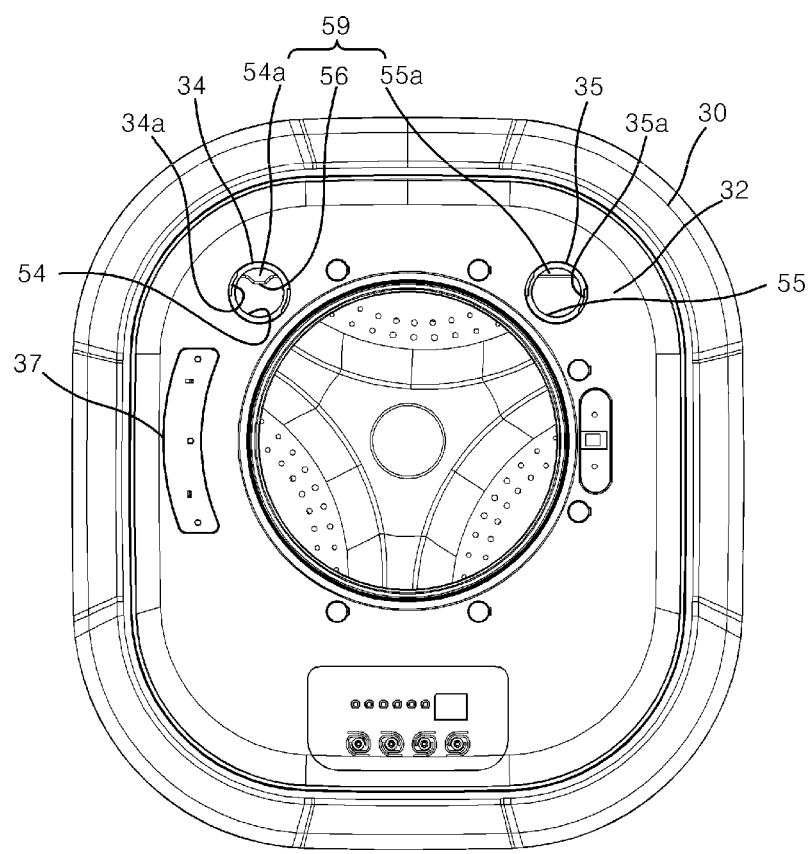
FIG. 24 is a diagram illustrating a misassembling prevention unit of the wall-mounted drum washing machine in accordance with the second embodiment of the present invention.

FIG. 22 is an expanded cross-sectional view of the detergent box mounting structure of the wall-mounted drum washing machine in accordance with the embodiment of the present invention. FIG. 23 is an expanded cross-sectional view of the conditioner box mounting structure of the wall-mounted drum washing machine in accordance with the embodiment of the present invention. FIG. 24 is a diagram illustrating a misassembling prevention unit of the wall-mounted drum washing machine in accordance with the second embodiment of the present invention.

Referring to FIGS. 18 to 24, the wall-mounted drum washing machine in accordance with the embodiment of the present invention further includes a detergent box 90 detachably installed in the front panel 50 through the cover unit 32.

Since the wall-mounted drum washing machine in accordance with the embodiment of the present invention is mounted on the wall surface W, a distance between the box unit 30 and the tub 20 housing a small drum and a distance between the cover unit 32 and the front panel 50 are inevitably set to a small value.

Therefore, in the present embodiment, the detergent box 90 is not installed in the cover unit 32 or the box unit 30, but detachably installed in the rear panel 10 through the cover unit 32.

The front panel 50 has a first insertion hole portion 54 into which the detergent box 90 is inserted, and the first insertion hole portion 54 has a first water supply hole 54b connected to the water supply pipe 74a.

The first insertion hole portion 54 is formed to protrude to the front side from the front surface of the front panel 50, and the first water supply hole 54b into which the water supply pipe 74a is inserted is formed at the top of the circumferential surface of the first insertion hole portion 54.

Since the water supply pipe 74a is inserted and connected to the first water supply hole 54b, water leakage does not occur between the water supply pipe 74a and the first water supply hole 54b.

Furthermore, sine the detergent box 90 is detachably installed in the first insertion hole portion 54 and the water supply pipe 74a is connected to the first water supply hole 54b, a separate detergent box 90 is not installed in the box unit 30 or the cover unit 32, but detergent and wash water are mixed in the front panel 50 and then directly supplied into the tub 20.

The detergent box 90 includes a first housing portion 91 and a first handle 92. The first housing portion 91 is inserted into the first insertion hole portion 54. The first handle 92 is rotatably connected to the first housing portion 91, and detachably coupled to the front panel 50.

The first housing portion 91 is formed in a container shape of which the top surface is opened, and the first handle 92 is rotatably coupled to the front surface of the first housing portion 91.

Therefore, when the first handle 92 is rotated after the first housing portion 91 is inserted into the first insertion hole portion 54, a locking operation is performed between the first handle 92 and a first lock hole portion 34 of the cover unit 32.

When the first handle 92 is rotated, the first housing portion 91 and the first handle 92 run idle with respect to each other. Therefore, the first housing portion 91 is not rotated.

The first housing portion 91 has a remaining water hole 91a formed therein. Thus, wash water supplied to the tub 20 through the first housing portion 91 does not remain in the first housing portion 91, but is discharged toward the tub 20 through the remaining water hole 91a.

The remaining water hole 91a is formed at the internal bottom of the first housing portion 91, and inclined toward the inside of the tub 20.

Therefore, the wash water discharged along the remaining water hole 91a from the first housing portion 91 is collected into the tub 20.

The remaining water hole 91a has a backflow prevention protrusion 91c to prevent wash water from flowing backward.

Thus, the wash water discharged from the first housing portion 91 is prevented from flowing backward through the gap between the first housing portion 91 and the first insertion hole portion 54.

The backflow prevention protrusion 91c is formed to protrude downward from the bottom surface of the remaining water hole 91a.

Therefore, the wash water introduced through the gap between the first housing portion 91 and the first insertion hole portion 54 along the bottom surface of the first housing portion 91, that is, the bottom surface of the remaining water hole 91a stands on the backflow prevention protrusion 91c and then drops downward so as to be collected into the tub 20.

The first insertion hole portion 54 has a first step portion 54c to prevent wash water from being introduced through the gap between the first housing portion 91 and the first insertion hole portion 54.

The first step portion 54c is formed by expanding the lower portion of the first insertion hole portion 54 in the downward direction.

As the gap between the first housing portion 91 and the first insertion hole portion 54 increases, wash water introduced through the gap between the bottom surface of the first housing portion 91 and the first insertion hole portion 54 is discharged toward the tub.

The first housing portion 91 has a first induction panel 91b formed on the rear surface of the first housing portion 91 and having a smaller height than both side surfaces thereof. Thus, when wash water supplied to the first housing portion 91 overflows, the overflowing wash water is supplied toward the tub 20 through the first induction panel 91b.

The first induction panel 91b of the first housing portion 91 is formed to have a smaller height than both side panels of the first housing portion 91.

Thus, when wash water supplied along a first water supply hole 54b is stored in the first housing portion 91 and then overflows from first housing portion 91, the wash water drops toward the tub 20 over the top of the first induction panel 91b.

The wall-mounted drum washing machine in accordance with the embodiment of the present invention further includes a conditioner box 100 detachably installed in the second insertion hole portion 55 through the cover unit 32.

When a washing operation is performed in a state where a fabric conditioner is contained in the conditioner box 100, wash water is supplied to the conditioner box 100 during a rinsing process. Then, the conditioner and the wash water are supplied into the tub 20.

The conditioner box 100 includes a second housing portion 101 and a second handle 102. The second housing portion 101 is inserted into the second insertion hole portion 55 and has a siphon portion 103 formed therein. The second handle 102 is rotatably connected to the second housing portion 101 and detachably coupled to the front panel 50.

The second housing portion 101 is formed in a container shape of which the top surface is opened, and the second handle 102 is rotatably coupled to the front surface of the second housing portion 101.

Therefore, when the second handle 102 is rotated after the second housing portion 101 is inserted into the second insertion hole portion 55, a locking operation is performed between the second handle 102 and a second lock hole portion 35 of the cover unit 32.

When the second handle 102 is rotated, the second housing portion 101 and the second handle 102 run idle with respect to each other. Therefore, the second housing portion 101 is not rotated.

The second housing portion 101 has the siphon portion 103 installed therein. Therefore, when wash water is supplied to the second housing portion 101, the wash water and the fabric conditioner do not remain in the second housing portion 101 due to a siphon effect, but are discharged toward the tub 20.

The second insertion hole portion 55 has a second step portion 55c to discharge wash water introduced through a gap between the second housing portion 101 and the second insertion hole portion 55 toward the tub 20.

The second step portion 55c is formed by expanding the lower portion of the second insertion hole portion 55 in the downward direction.

As the gap between the second housing portion 101 and the second insertion hole portion 55 increases, wash water introduced to the gap between the bottom of the second housing portion 101 and the second insertion hole portion 55 does not remain, but is discharged toward the tub 20.

The second housing portion 101 includes a second induction panel 101a formed on the rear surface thereof and having a smaller height than both side surfaces thereof. Thus, when wash water supplied to the second housing portion 101 overflows, the overflowing wash water is supplied to the tub 20 along the second induction panel 101a.

The second induction panel 101a of the second housing portion 101 is formed to have a smaller height than both side surfaces of the second housing portion 101.

Therefore, when the wash water supplied along a second supply hole 55b is stored in the second housing portion 101 and then overflows from the second housing portion 101, the wash water drops toward the tub 20 over the top of the second induction panel 101a.

The bottom surface of the second housing portion 101 is inclined toward the siphon portion 103.

The wash water or fabric conditioner remaining on the bottom surface of the second housing portion 101 moves toward the siphon portion 103 along the inclined bottom surface. Therefore, the wash waster or fabric conditioner does not remain in the second housing portion 101 due to the operation of the siphon portion 103.

The siphon portion 103 includes a discharge pipe 103a and a cover portion 103b. The discharge pipe 103a protrudes upward from the bottom surface of the second housing portion 101. The cover portion 103b covers the top of the discharge pipe 103a while spaced at a predetermined interval from the discharge pipe 103a.

When wash water is supplied to the second housing portion 101 containing fabric conditioner, the wash water and the fabric conditioner are discharged toward the discharge pipe 103a along the gap between the discharge pipe 103a and the cover portion 103b due to the siphon effect.

Furthermore, the wall-mounted drum washing machine in accordance with the embodiment of the present invention includes a misassembling prevention unit 59 to prevent the detergent box 90 and the conditioner box 100 from being switched and inserted.

Since the first and second housing portions 91 and 101 have a similar shape and size to each other, a user may switch and insert the detergent box 90 and the conditioner box 100.

In the wall-mounted drum washing machine in accordance with the embodiment of the present invention, the misassembling prevention unit 59 prevents the detergent box 90 and the conditioner box 110 from being switched and inserted.

Therefore, it is possible to prevent a user's mistake. Specifically, it is possible to prevent a washing operation from being started in a state where the conditioner box 100 is inserted into the first insertion hole portion 54 and the detergent box 90 is inserted into the second insertion hole portion 55.

The first handle 92 has a first lock portion 92a formed thereon, and the first lock hole portion 34 of the cover unit 32 into which the first handle 92 is inserted has a first stopper 34a to restrict the rotation of the first lock portion 92a.

The first handle 92 has a first coupling groove 91d formed on the rear surface thereof, into which a first hook portion 92b of the first housing portion 91 is rotatably inserted. Thus, the first handle 92 and the first housing portion 91 are connected to run idle with respect to each other.

The first handle 92 has a pair of first lock portions 92a formed on the circumferential surface thereof, and the first lock hole portion 34 of the cover unit 32 has a pair of first stoppers 34a formed at a predetermined distance from each other such that the first lock portions 92a are locked to the first stoppers 34a.

The first stoppers 34a are formed in a protrusion shape to protrude to the center from the circumference of the first lock hole portion 34, and arranged at two positions of the first lock hole portion 34 so as to be spaced from each other.

When the first handle 92 is inserted into the first lock hole portion 34 and then rotated in a state where the first lock portions 92a and the first stoppers 34a are disposed to be spaced from each other, the first lock portions 92a and the first stoppers 34a overlap each other.

Therefore, the first handle 92 is locked so as not to be separated from the first lock hole portion 34.

At this time, since the first handle 92 and the first housing portion 91 run idle with respect to each other, it is possible to prevent the detergent contained in the first housing portion 91 from pouring.

The second handle 102 has a pair of second lock portions 104 formed thereon, and the second lock hole portion 35 of the cover unit 32, into which the second handle 102 is inserted, has a pair of second stoppers 35a to restrict the rotation of the second lock portions 104.

The second handle 102 has a second coupling groove 101b formed on the rear surface thereof, into which a second hook portion 102a of the second housing portion 101 is rotatably inserted. Thus, the second handle 102 and the second housing portion 101 are connected to run idle with respect to each other.

The second handle 102 has the pair of second lock portions 104 formed on the circumferential surface thereof, and the second lock hole portion 35 of the cover unit 32 has the pair of second stoppers 35a formed at a predetermined distance from each other such that the second lock portions 104 are locked to the second stoppers 35a.

The second stoppers 35a are formed in a protrusion shape to protrude to the center from the circumference of the second lock hole portion 35, and are formed at two positions of the second lock hole portion 35 so as to be spaced at a predetermined distance from each other.

When the second handle 102 is inserted into the second lock hole portion 35 and then rotated in a state where the second lock portions 104 and the second stoppers 35a are disposed to be spaced from each other, the second lock portions 104 and the second stoppers 35a overlap each other.

Therefore, the second handle 102 is locked so as not to be separated from the second lock hole portion 35.

At this time, since the second handle 102 and the second housing portion 101 are connected to run idle with respect to each other, it is possible to prevent the fabric conditioner contained in the second housing portion 101 from pouring.

The first lock hole portion 34 has a first blocking panel 54a extended from the top thereof toward the first housing portion 91, and the second lock hole portion 35 has a second blocking panel 55a extended from the top thereof toward the second housing portion 101.

The first blocking panel 54a is disposed at the top of the first housing portion 91 when the first housing portion 91 is inserted, and disposed close to the first handle 92 in a state where the first housing portion 91 is inserted into the first insertion hole portion 54.

Therefore, when wash water is supplied through the first water supply hole 54b, the wash water overflowing to the outside of the first housing portion 91 may be prevented from leaking toward the first handle 92.

The second blocking panel 55a is disposed at the top of the second housing portion 101 when the second housing portion 101 is inserted, and disposed close to the second handle 102 in a state where the second housing portion 101 is inserted into the second insertion hole portion 55.

When wash water is supplied through the second water supply hole 55b, the wash water overflowing to the outside of the second housing portion 101 may be prevented from leaking toward the second handle 102.

The misassembling prevention unit 59 includes a blocking portion 56 formed on the first blocking panel 54a extended from the first insertion hole portion 54 toward the first housing portion 91 and interfering with the siphon portion 103.

The siphon portion 103 formed in the second housing portion 101 is formed in an elongated shape to protrude toward the top of the second housing portion 101.

When the second housing portion 101 is inserted into the first insertion hole portion 54, the siphon portion 103 and the blocking portion 56 interfere with each other such that the second housing portion 101 cannot be inserted into the first insertion hole portion 54.

Thus, it is possible to prevent a user's mistake. For example, it is possible to prevent a washing operation from being started in a state where the detergent box 90 and the conditioner box 100 are switched and inserted.

Furthermore, the door 60 installed on the front panel 50 has sensing grooves 61 into which the first and second handles 92 and 102 are inserted (refer to FIG. 13).

When the door 60 is closed in a state where the first and second handles 92 and 102 are not completely locked, the first and second handles 92 and 102 are not inserted into the sensing groove portion 61.

Therefore, the user cannot close the door 60 in a state where the first and second handles 92 and 102 are not completely locked. As such, when the drum washing machine is not imperfectly set, a normal washing operation cannot be performed.

Figure 25:
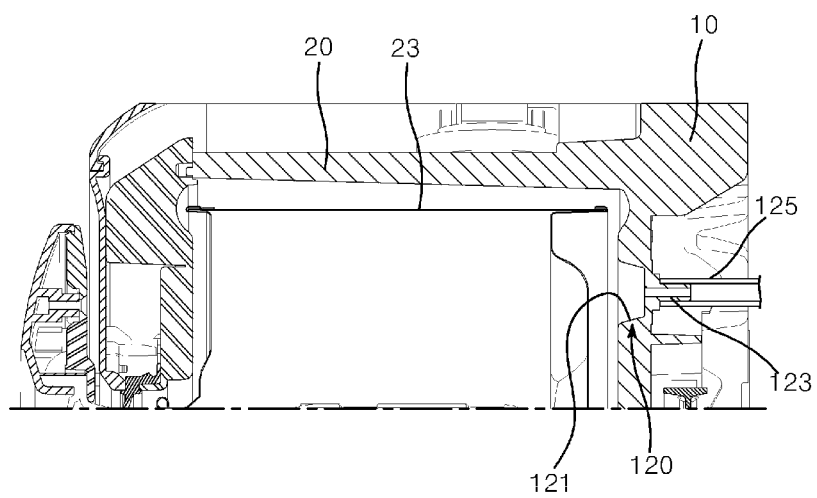
FIG. 25 is a cross-sectional view of an overflow prevention unit of the wall-mounted drum washing machine in accordance with the embodiment of the present invention.

FIG. 25 is a cross-sectional view of an overflow prevention unit of the wall-mounted drum washing machine in accordance with the embodiment of the present invention.

Referring to FIGS. 2 and 25, the wall-mounted drum washing machine in accordance with the embodiment of the present invention further includes an air discharge port 123 and a clogging prevention portion 120. The air discharge port 123 is formed in the rear panel 10 so as to discharge air stored in the tub 20. The clogging prevention portion 120 serves to prevent clogging of the air discharge port 123.

Through the air discharge port 123 formed at the top of the central portion of the rear panel 10, high-pressure air inside the tub 20 is discharged to the outside of the tub 20.

The air discharge port 123 includes a ventilation pipe 125 to guide the air discharged from the tub 20 to the outside, and the ventilation pipe 125 is extended toward the second through-groove 12c by the guide unit 12.

The ventilation pipe 125 may be coupled to the installation hole portion 13a in a state where the cable member 13b is wounded around the ventilation pipe 125, like the power line 11a.

The clogging prevention portion 120 includes a foaming portion 121 formed in the rear panel 10 so as to expand an end portion of the air discharge port 123.

Since the foaming portion 121 has a larger diameter than the air discharge port 123, the foaming portion 121 prevents the air discharge port 123 from clogging with foam formed in the tub 20.

The clogging prevention portion 120 further includes the guide unit 12 formed in the rear panel 10 such that the ventilation pipe 125 connected to the air discharge port 123 is extended toward a higher position than the air discharge port 123.

Both of the power line 11a and the ventilation pipe 125 may be inserted into the guide unit 12. When the cable member 13b wounded around the ventilation pipe 125 is coupled to the installation hole portion 1013a by the coupling member 16a, the ventilation pipe 125 may be prevented from coming off to the outside of the fixing portion 12a.

The ventilation pipe 125 extended to the inside of the fixing portion 12a is extended toward the bottom of the rear panel 10, and exposed to the outside of the rear panel 10 through the second through-groove 12c.

Figure 26:
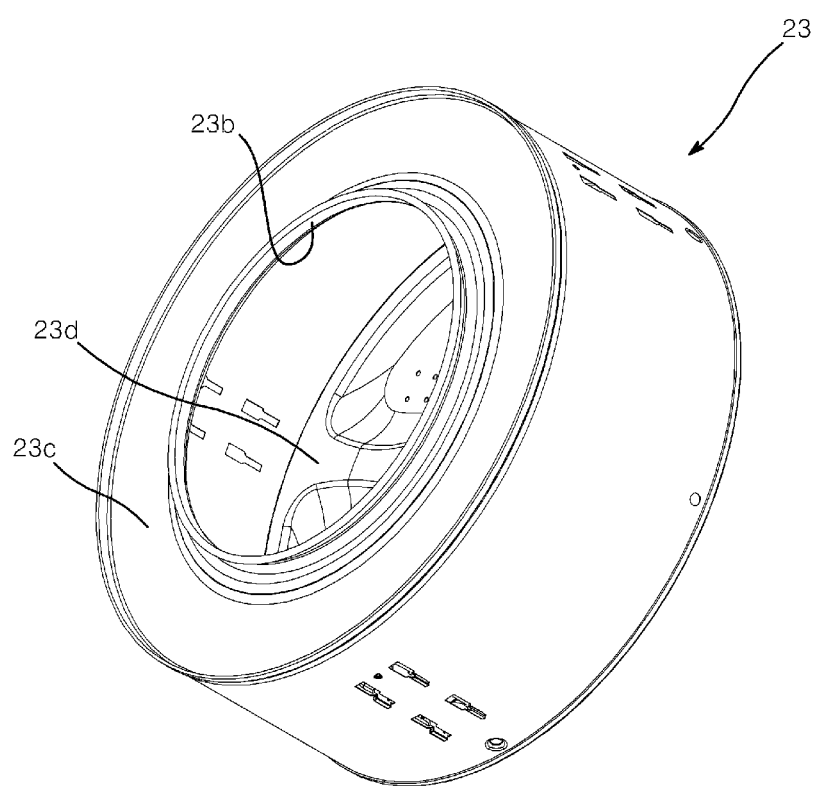
FIG. 26 is a front perspective view of the drum of the wall-mounted drum washing machine in accordance with the embodiment of the present invention.
Figure 27:
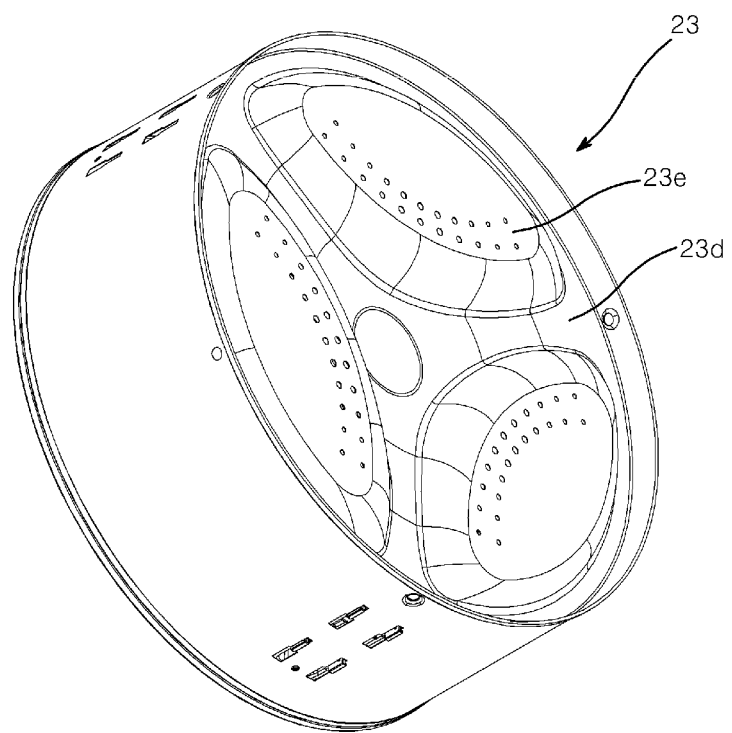
FIG. 27 is a rear perspective view of the drum of the wall-mounted drum washing machine in accordance with the embodiment of the present invention.
Figure 28:
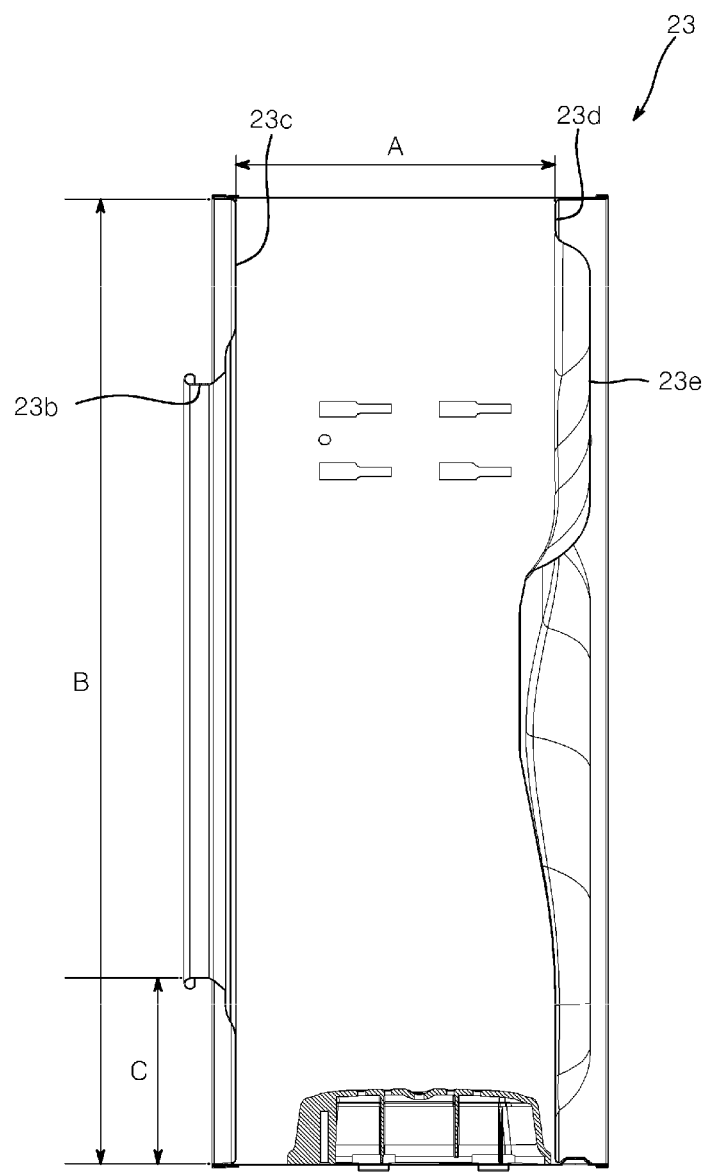
FIG. 28 is cross-sectional view of the drum of the wall-mounted drum washing machine in accordance with the embodiment of the present invention.

FIG. 26 is a front perspective view of the drum of the wall-mounted drum washing machine in accordance with the embodiment of the present invention. FIG. 27 is a rear perspective view of the drum of the wall-mounted drum washing machine in accordance with the embodiment of the present invention. FIG. 28 is cross-sectional view of the drum of the wall-mounted drum washing machine in accordance with the embodiment of the present invention.

Referring to FIGS. 26 to 28, the drum 23 of the wall-mounted drum washing machine in accordance with the embodiment of the present invention is formed to have a larger diameter B than the depth A of the drum 23. At this time, the depth A of the drum 23 indicates a distance from the front surface 23c to the rear surface 23d of the drum 23.

Since the diameter B of the drum 23 is larger than the depth A thereof, that is, the diameter B is set to a relatively large value and the depth A is set to a relatively small value, the front-to-rear length of the drum 23 may be reduced when the same capacity is intended to be implemented.

Since the front-to-rear length of the wall-mounted drum washing machine is reduced, it is possible to reduce the protrusion of the drum washing machine from the wall surface W.

In accordance with the embodiment of the present invention, the depth A of the drum 23 is set to 120 to 130 mm. When the drum 23 is formed to have a depth of less than 120 mm, it may be difficult to house laundry between the front surface 23c and the rear surface 23d of the drum 23. Therefore, it becomes inconvenient to put the laundry.

Furthermore, when the drum 23 is formed to have a depth of more than 130 mm, the front-to-rear length of the drum washing machine may be increased so that the drum washing machine occupies a large installation space. Therefore, the exterior quality of the wall-mounted drum washing machine may be degraded, and the space occupied by the drum washing machine may be increased to reduce a user's action radius.

Therefore, when the depth A of the drum 23 is set to 120 to 130 mm, it may become easy to put the laundry, and the exterior quality of the drum washing machine may be improved. Furthermore, the protrusion of the drum washing machine may be reduced to increase a user's action radius.

The diameter B of the drum 23 may be set 3 to 3.2 times larger than the depth A of the drum 23.

When the diameter B of the drum 23 is less than a value which is three times larger than the depth A of the drum 23, the drum 23 has a relatively large depth. Thus, the protrusion of the drum washing machine from the wall surface W increases.

Therefore, as described above, the front-to-rear length of the drum washing machine is increased so that the drum washing machine occupies a large installation space. Thus, the exterior quality of the wall-mounted drum washing machine may be degraded, and the space occupied by the drum washing machine may be increased to reduce a user's action radius.

When the diameter B of the drum 23 is more than a value which is 3.2 times larger than the depth A of the drum 23, the horizontal and vertical sizes of the product are increased. Therefore, the area of the wall surface W required for mounting the drum washing machine may be increased to make it difficult to install the drum washing machine.

Therefore, when the diameter B of the drum 23 is set 3 to 3.2 times larger than the depth A of the drum 23, it may become easy to put the laundry, the exterior quality of the drum washing machine may be improved, and the protrusion of the drum washing machine may be reduced to increase a user's action radius.

Furthermore, the shortest distance C from the circumference of the drum 23 to an input hole 23b is set 0.4 to 0.8 times smaller than the depth A of the drum 23.

When the shortest distance C from the circumference of the drum 23 to the input hole 23b is less than a value which is 0.4 times smaller than the depth A of the drum 23, the space required for housing laundry may be reduced to make it inconvenient to put the laundry. In this case, the laundry put into the drum 23 may come out of the drum 23.

Furthermore, when the shortest distance C from the circumference of the drum 23 to the input hole 23b exceeds a value which is 0.8 times smaller than the depth A of the drum 23, the size of the input hole 23b may be reduced to make it inconvenient to take out the laundry.

Therefore, when the shortest distance C from the circumference of the drum 23 to the input hole 23b is set 0.4-0.8 times smaller than the depth A of the drum 23, it may become easy to put laundry, and the exterior quality of the drum washing machine may be improved. Furthermore, the protrusion of the drum washing machine may be reduced to increase a user's action radius.

The drum 23 includes a plurality of protrusions 23e formed on the rear surface 23d thereof, and the protrusions 23e are arranged to be spaced at a predetermined distance from each other and connected to the driving unit 40.

The operation of the wall-mounted drum washing machine in accordance with the embodiment of the present invention will be described as follows.

First, when the wall-mounted drum washing machine is installed, four coupling members 16a are installed on the wall surface W, and the buffer member 16c is inserted into the coupling members 16a. Then, the rear panel 10 is mounted on the wall surface W such that the coupling members 16a are inserted into the through-holes 16 of the rear panel 10.

The coupling members 16a protruding toward the front surface 10a of the rear panel 10 through the through-holes 16 are coupled to the nut members 16b, and the nut members 16b are closely attached to the front surface 10a.

Then, when the cover unit 32 and the box unit 30 are assembled and the box unit 30 is put on the rear panel 10, the end portion of the box unit 30 is received on the receiving portion 15, and the guide protrusions 38 are inserted into the guide grooves 15a. Then, the box unit 30 is received at the precise position of the rear panel 10.

At this time, the end of the box unit 30 is disposed to be spaced at a predetermined interval from the receiving portion 15. While pressing the box unit 30 and the cover unit 32 toward the receiving portion 15, the operator inserts the coupling members 16a into the upper and lower parts of the box unit 30 such that the box unit 30 is coupled to the rear panel 10.

After the installation of the wall-mounted drum washing machine is completed, the box unit 30, the cover unit 32, and the rear panel 10 are fastened by an elastic force generated between the box unit 30 and the cover unit 32. Therefore, the coupling force among the respective parts may be improved.

When a user wants to perform a washing operation, the user opens the door 60, puts laundry into the drum 23, separates the detergent box 90 and the conditioner box 100, puts detergent and fabric conditioner into the first and second housings 91 and 101, and inserts the first and second housings 91 and 101 into the first and second insertion hole portions 54 and 55, respectively.

At this time, the first insertion hole portion 54 has the blocking portion 56 extended downward from the first blocking panel 54a. Thus, when the conditioner box 100 is inserted into the first insertion hole portion 54, the siphon portion 103 and the blocking portion 56 interfere with each other. Therefore, it is possible to prevent a user's mistake of switching and inserting the detergent box 90 and the conditioner box 100.

After the detergent box 90 and the conditioner box 100 are inserted into the first and second insertion hole portions 54 and 55, the user rotates the first and second handles 92 and 102 such that the first and second lock portions 92a and 104 overlap the first and second stoppers 34a and 35a, respectively. Then, the detergent box 90 and the conditioner box 100 are locked.

Then, when the user presses the manipulation unit to start a washing operation, the water supply valves are opened to supply wash water to the tub 20.

At this time, the wash water supplied to the detergent box 90 through the first water supply hole 54b along the water supply pipe 74a is stored in the first housing portion 91.

Then, when the wash water is continuously supplied, the wash water overflows from the top of the first induction panel 91*b* so as to be supplied into the tub 20.

When the supply of the wash water is completed, the motor 41 is driven according to an operation signal transmitted from the control block 22, and power transmitted along the belt 43 from the rotating shaft 41*a* of the motor 41 rotates the driving wheel 42 and the drum 23 to perform the washing operation.

In the present embodiment, since the tub 20, the rear panel 10, and the reinforcement unit 14 are integrally formed, it is possible to prevent the tub 20 from being moved by vibrations generated while the drum 23 is rotated. Furthermore, the buffer member 16*c* interposed between the rear panel 10 and the wall surface W may prevent the vibrations of the drum 23 from being transmitted to the wall surface W.

Thus, it is possible to provide the drum washing machine which may be installed on the wall surface and includes the power line 11*a* of which the extension direction is varied.

Figure 29:
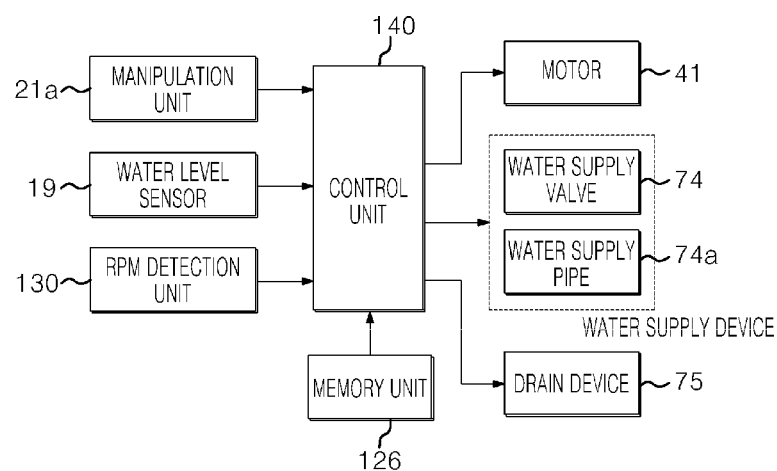
FIG. 29 is a block configuration diagram of the wall-mounted drum washing machine in accordance with the embodiment of the present invention.

FIG. 29 is a block configuration diagram of the wall-mounted drum washing machine in accordance with the embodiment of the present invention.

Referring to FIG. 29, components which are used in a control method for the wall-mounted drum washing machine in accordance with a first embodiment of the present invention will be described in detail. The wall-mounted drum washing machine includes the manipulation unit 21*a*, the water level sensor 19, the control unit 140, the motor 41, the water supply device 74 and 74*a*, the drain device 75, and a memory unit 126.

The manipulation unit 21*a* serves to receive various control commands from a user, and includes various keys which are installed on the front surface of the wall-mounted drum washing machine and used to control a washing process, a rinsing process, and a spin-drying process. Through the manipulation unit 21*a*, a user may directly input the operation number of each process, a water level, a time, a water temperature, whether or not to input detergent, the amount of detergent and the like.

The washing process refers to a process in which a user injects wash water and detergent into the drum 23 and operates the motor 41 to remove old stains, at the initial stage of the operation of the wall-mounted drum washing machine. The rinsing process refers to a process in which a user injects clean water into the drum 23 and operates the motor 41 to cleanly rinse the laundry. The spin-drying process refers to a process in which the laundry is spin-dried through a centrifugal force generated by rotating a the drum 23 at high speed.

The water level sensor 19 serves to measure the level of water supplied to the drum 23 during each process and input the measured level to the control unit 21. In the present embodiment, the water level sensor 19 not only measures the level of wash water to determine the start of the washing process, but also measures the rinsing level of foam formed by detergent to determine whether or not a proper amount of detergent is used.

The rinsing level indicates a level which is measured before the rinsing process is performed after the washing process is completed. When the rinsing level is measured, the foam formed by the detergent is included. Thus, as the amount of foam increases, the rinsing level increases.

The motor 41 rotates the drum 23 in a forward/reverse rotation direction or rotates the drum 23 at a preset RPM according to a control signal of the control unit 140.

The water supply device 74 and 74*a* serves to supply water required for the drum 23 during each process, according to the control signal of the control unit 140. The water supply device 74 and 74*a* includes a water supply pipe 74 and a water supply valve 74*a*. The water supply pipe 74 has one side connected to a water pipe or tap so as to transfer water to the drum 23. The water supply valve 74*a* is installed in the water supply pipe and opens/closes the water supply pipe to supply water to the drum or block water.

The drain device 75 discharges water stored in the drum 23 to the outside of the wall-mounted drum washing machine according to the control signal of the control unit 140. The drain device 75 includes a drain pipe, a drain valve, and a drain pump, which are not illustrated in the drawings. The drain pipe has one side connected to the tub 20 so as to transfer water stored in the tub 20 to the outside of the wall-mounted drum washing machine. The drain valve is installed in the drain pipe and opens/closes the drain pipe to discharge water to the outside or block water. The drain pump forcibly discharges water stored in the tub 20 to the outside of the wall-mounted drum washing machine.

The memory unit 126 is configured to store a lookup table indicating the corresponding relation among the initial number of rinsing processes which is initially set by a user or previously set, the rinsing level, and the number of rinsing processes, and transmit the value to the control unit 140 according to a command of the control unit 140.

At this time, as the rinsing level increases, it may indicate that a large amount of foam is formed by the detergent. Thus, according to the corresponding relation of the lookup table, the number of rinsing processes increases as the rinsing level increases.

The control unit 140 controls the overall operations of the wall-mounted drum washing machine in accordance with the embodiment of the present invention. In the present embodiment, since the control unit 140 receives the rinsing level measured after the washing process and automatically adds a rinsing process, the cleaning ability of the drum washing machine may be improved.

At this time, in order to determine an additional number of rinsing processes, the control unit 140 receives the corresponding relation between the rinsing level and the number of rinsing processes, which is previously stored in the memory unit 126.

The operation of the control unit 140 will be described in detail with reference to FIG. 30.

Figure 30:
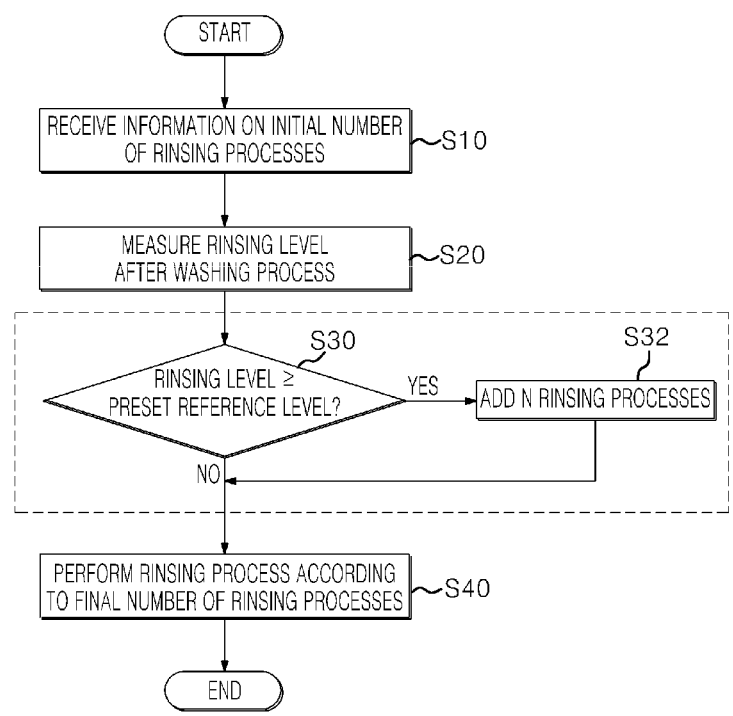
FIG. 30 is an operation flowchart of a control method for the wall-mounted drum washing machine in accordance with a first embodiment of the present invention.

FIG. 30 is an operation flowchart of the control method for the wall-mounted drum washing machine in accordance with the first embodiment of the present invention.

Referring to FIGS. 29 and 30, the control method for the wall-mounted drum washing machine in accordance with the first embodiment of the present invention will be described as follows. First, the control unit 140 performs a washing process according to a value inputted through the manipulation unit 21*a*, and receives information on the number of rinsing processes, which is initially set, from the memory unit 126, at step S10. Then, the control unit 140 measures a rinsing level through the water level sensor 19 after the washing process is completed, at step S20.

Then, the control unit 140 determines a final number of rinsing processes according to the rinsing level measured by the water level sensor 19 at steps S30 and 32. At this time, the final number of rinsing processes does not indicate the number of rinsing processes, which is initially set by a user or internally set in the wall-mounted drum washing machine, but indicates the total number of rinsing processes including additional rinsing processes which are determined according to the rinsing level.

The step of determining the final number of rinsing processes includes determining whether the rinsing level measured by the water level sensor 19 is equal to or more than a preset reference level at step S30, and adding rinsing processes when the rinsing level is equal to or more than the preset reference level at step S32.

The preset reference level indicates a rinsing level at which additional rinsing processes are required. When an excessive amount of detergent is used, foam is formed by the detergent so as to increase the rinsing level. Thus, additional rinsing processes are needed.

Furthermore, as the rinsing level increases, the additional number of rinsing processes also increases. At this time, in order to determine the additional number of rinsing processes, the control unit 140 receives the corresponding relation between the rinsing level and the number of rinsing processes, which is previously stored in the memory unit 126.

That is, according to the corresponding relation between the rinsing level and the number of rinsing processes which is previously stored in the memory unit 126, the control unit 140 determines n rinsing processes which are additionally required, where n is a natural number, and then determines the final number of rinsing processes.

However, when the measured rinsing level is less than the preset reference level, the initial number of rinsing processes may be set to the final number of rinsing processes.

Then, the control unit 140 performs rinsing processes by the determined final number at step S40. As described above, when the rinsing level exceeds the preset reference level, the final number of rinsing processes may increase by n from the initial number of rinsing processes, and when the rinsing level is less than the preset reference level, the initial number of rinsing processes may be set to the final number of rinsing processes.

In the control method for the wall-mounted drum washing machine in accordance with the first embodiment of the present invention, when a proper amount of detergent or more is used while a washing operation is performed by the wall-mounted drum washing machine, the level of foam formed by the detergent may be measured. When the level exceeds the reference level, rinsing processes may be automatically added to improve the cleaning ability of the wall-mounted drum washing machine.

Furthermore, the washing operation of the wall-mounted drum washing machine in accordance with the embodiment of the present invention may be performed by adding rinsing processes, without adding separate parts. Thus, since the design of the wall-mounted drum washing machine does not need to be changed, a manufacturing cost may be reduced.

Referring to FIG. 29, components which are used in control methods for the wall-mounted drum washing machine in accordance with second to fourth embodiments of the present invention will be described in detail. The wall-mounted drum washing machine includes an RPM detection unit 130, the control unit 140, the motor 41, the water supply valve 74, and the drain device 75.

The RPM detection unit 130 is configured to detect the RPM of the motor 41 and transmit the detected RPM to the control unit 140.

The RPM detection unit 130 may include a hall sensor (not illustrated) attached on a stator (not illustrated) of the motor 41 and configured to generate a pulse signal whenever a magnetic force radiated from a permanent magnet attached on a rotor (not illustrated) of the motor 41 is detected.

Furthermore, the RPM detection unit 130 may include an encoder configured to measure the RPM of the motor 41.

The control unit 140 reduces the RPM of the motor 41 during a deceleration section of a spin-drying process of the wall-mounted drum washing machine. When the RPM of the motor 41 reaches a reference speed (a), the control unit 140 opens the water supply valve 74 to supply water to one or more of the detergent box 90 and the conditioner box 100 for a foam removal time $t_F$, in order to remove foams of the detergent box 90 and the conditioner box 100.

Then, the control unit 140 operates the drain device 75 to discharge the water supplied to the tub 20, in order to remove the foams.

The reference speed (a) indicates the RPM of the motor 41, which is set to a reference value for removing foams of the detergent box 90 and the conditioner box 100 after the spin-drying process is completed. The reference speed (a) may be selected in various manners depending on the specifications of products or systems to be applied. For example, the reference speed may be selected as 300 RPM.

Furthermore, the foam removal time $t_F$ indicates a time during which the water supply valve 74 is opened to supply water to the detergent box 90 and the conditioner box 100, in order to remove foams of the detergent box 90 and the conditioner box 100. The foam removal time $t_F$ may be selected in various manners depending on the specifications of products or systems to be applied.

At this time, the foam removal time $t_F$ may be set in such a manner that a small amount of water is supplied and the drum 23 is not dipped into the water.

That is, the amount of water supplied to remove the foams of the detergent box 90 and the conditioner box 100 may be set to such a level as not to dip the drum 23, while filling the detergent box 90 and the conditioner box 100.

The control unit 140 may rotate the motor 41 at the reference speed (a) for the foam removal time $t_F$ in which the water supply valve 74 is opened.

For example, when the RPM of the motor 41 decreases to the reference speed of 300 RPM, the control unit 140 may maintain the RPM of the motor 41 at the reference speed (a) of 300 RPM for the foam removal time $t_F$.

As the control unit 140 constantly maintains the RPM of the motor 41 for the foam removal time $t_F$ in which the water supply valve 74 is opened, the supplied water may be prevented from being introduced into the drum 23.

The control unit 140 may stop the control for the motor 41 during the deceleration section of the spin-drying process of the wall-mounted drum washing machine, unlike the above-described method. In this case, the motor 41 is continuously rotated by inertia, and the RPM of the motor 41 gradually decreases.

At this time, the control unit 140 receives the RPM of the motor 41 from the RPM detection unit 130 and checks whether or not the RPM of the motor 41 reaches the reference speed (a). When the RPM of the motor 41 decreases to the reference speed (a), the control unit 140 opens the water supply valve 74 to supply water to one or more of the detergent box 90 and the conditioner box 100 for the foam removal time $t_F$, thereby removing the foams of the detergent box 90 and the conditioner box 100.

Even in this case, the control unit 140 may rotate the motor 41 at the reference speed (a) for the foam removal time $t_F$ in which the water supply valve 74 is opened, thereby preventing the supplied water from being introduced into the drum 23.

Referring to FIG. 29, the motor 41 rotates the drum 23, and the operation is controlled by the control unit 140 as described above.

The water supply valve 74 is a valve to restrict water supplied from a water supply source, and opening/closing of the water supply valve 74 is controlled by the control unit 140.

The water supply valve 74 may include two water supply valves 74 to supply water to the water detergent box 90 and the conditioner box 100, respectively.

When the water supply valve 74 is opened, water is supplied to the detergent box 90 or the conditioner box 100 through the water supply pipe 74*a*. Then, the water supplied to the detergent box 90 or the conditioner box 100 is supplied to the tub 20.

The drain box 75 discharges the water supplied to the tub 20, and the operation is controlled by the control unit 140.

Figure 31:
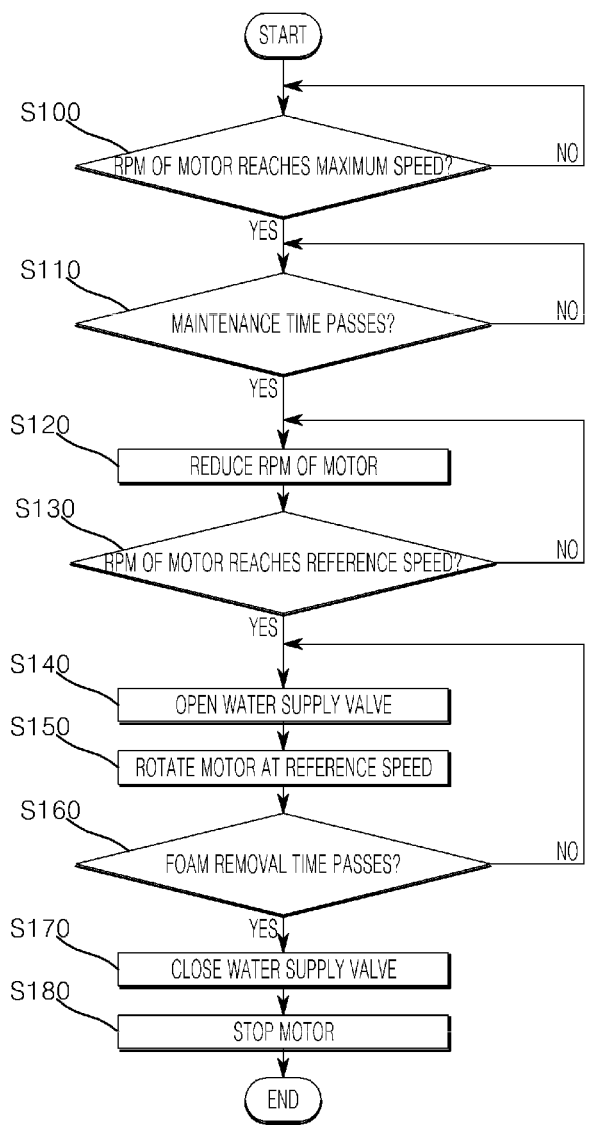
FIG. 31 is a flowchart illustrating a control method for the wall-mounted drum washing machine in accordance with a second embodiment of the present invention.
Figure 32:
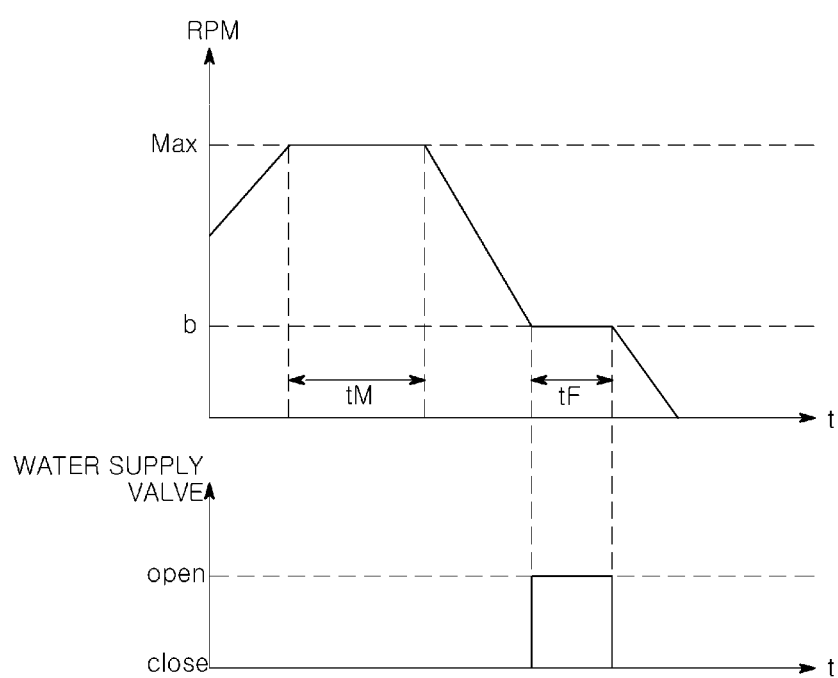
FIG. 32 is a graph illustrating RPM change of a motor with time in the control method for the wall-mounted drum washing machine in accordance with the second embodiment of the present invention.

FIG. 31 is a flowchart illustrating the control method for the wall-mounted drum washing machine in accordance with the second embodiment of the present invention. FIG. 32 is a graph illustrating the RPM change of the motor with time in the control method for the wall-mounted drum washing machine in accordance with the second embodiment of the present invention.

Hereafter, referring to FIGS. 31 and 32, the control method for the wall-mounted drum washing machine in accordance with the second embodiment of the present invention will be described in detail.

First, the control unit 140 receives information on the RPM of the motor 41 from the RPM detection unit 130 during a spin-drying process, and determines whether or not the RPM reaches a maximum speed Max, at step S100.

When the RPM of the motor 41 reaches the maximum speed Max, the control unit 140 determines whether or not a maintenance time $t_M$ passes, at step S110. During the maintenance time $t_M$, the maximum speed Max is maintained for the spin-drying process.

Then, when the maintenance time $t_M$ passed, the control unit 140 reduces the RPM of the motor 41 to end the spin-drying process, at step S120.

Then, the control unit 140 checks whether or not the RPM of the motor 41 reaches the reference speed (a) at step S130.

When the RPM of the motor 41 reaches the reference speed (a), the control unit 140 opens the water supply valve 74 at step S140, and rotates the motor 41 at the reference speed (a) at step S150.

On the other hand, when the RPM of the motor 41 does not reach the reference speed (a), the control unit 140 returns to the step S120 in which the control unit 140 reduces the RPM of the motor 41.

Then, the control unit 140 checks whether or not a preset foam removal time $t_F$ passes from the time at which the water supply valve 74 is opened, at step S160. When the foam removal time $t_F$ passes, the control unit 140 closes the water supply valve 74 at step S170, and stops the motor 41 at step S180.

That is, the control unit 140 removes the foams of the detergent box 90 and the conditioner box 100 by opening the water supply valve 74 while rotating the motor 41 at the reference speed (a), for the foam removal time $t_F$.

Then, the control unit 140 operates the drain device 75 to discharge the water supplied into the tub 20, and then ends the spin-drying process.

As such, when the motor 41 is rotated at the reference speed (a) to supply water, the foams of the detergent box 90 and the conditioner box 100 may be removed while the water is prevented from being introduced into the drum 23.

Figure 33:
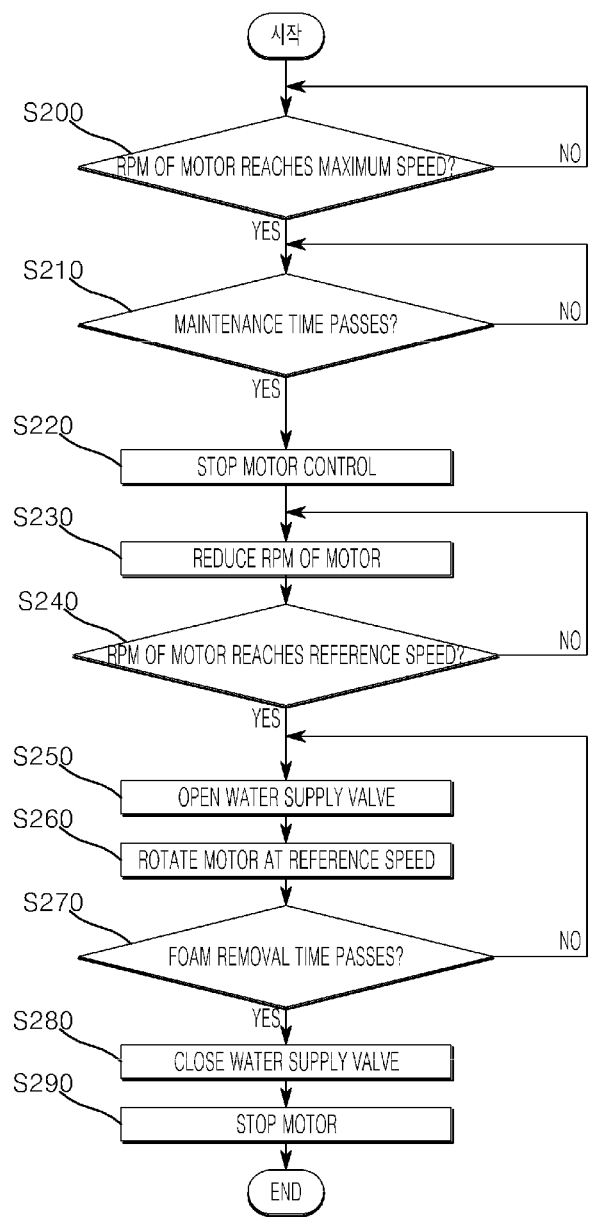
FIG. 33 is a flowchart illustrating a control method for the wall-mounted drum washing machine in accordance with a third embodiment of the present invention.

FIG. 33 is a flowchart illustrating the control method for the wall-mounted drum washing machine in accordance with the third embodiment of the present invention.

In the above-described second embodiment, it has been described that, when the maintenance time $t_M$ passes, the control unit 140 reduces the RPM of the motor 41 to the reference speed (a). However, when the spin-drying process is completed, the control unit 140 may stop the control for the motor 41.

That is, when the RPM of the motor 41 reaches the maximum speed Max at step S200 and the maintenance time $t_M$ for maintaining the maximum speed Max passes at step S210, the control unit 140 stops the control for the motor 41 at step S220.

When the control for the motor 41 is stopped, the RPM of the motor 41 gradually decreases.

Then, the control unit 140 receives the RPM of the motor 41 from the RPM detection unit 130 at step S230, and checks whether or not the RPM of the motor 41 reaches the reference speed (a) at step S240.

When the RPM of the motor 41 reaches the reference speed (a), the control unit 140 opens the water supply valve 74 at step S250, and rotates the motor 41 at the reference speed (a) at step S260.

Then, steps S270 to S290 in which the control unit 140 determines whether or not the foam removal time $t_F$ passes, closes the water supply valve 74, and stops the motor 41 may be performed in the same manner as the steps S160 to S180 of the above-described embodiment. Thus, the detailed descriptions thereof are omitted.

Figure 34:
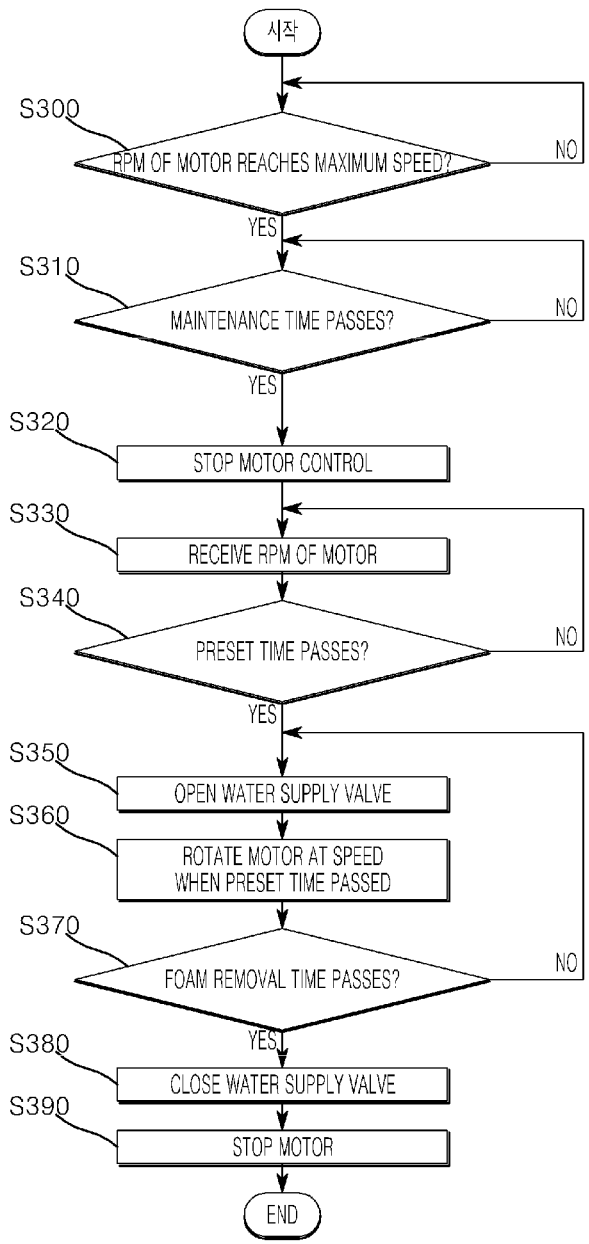
FIG. 34 is a flowchart illustrating a control method for the wall-mounted drum washing machine in accordance with a fourth embodiment of the present invention.
Figure 35:
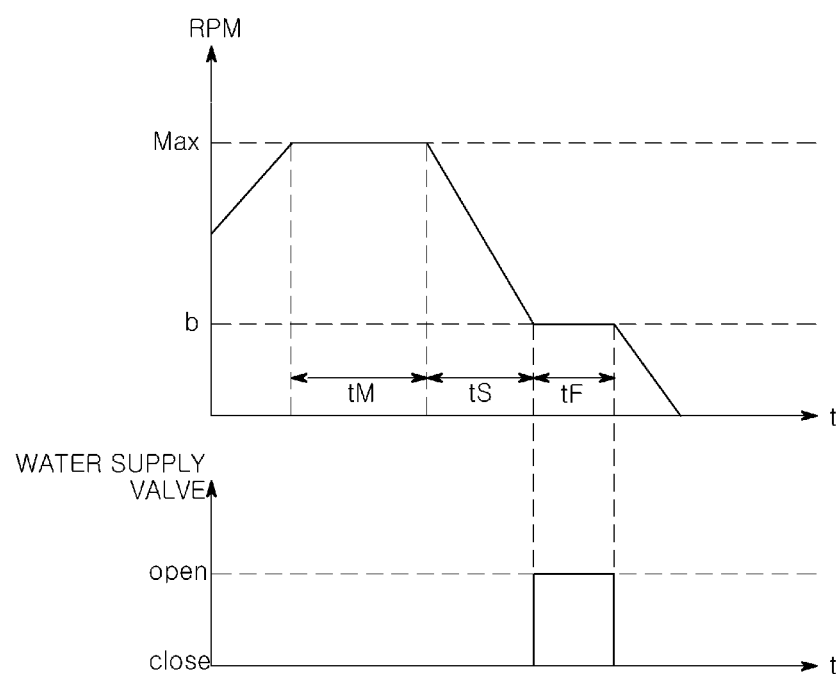
FIG. 35 is a graph illustrating RPM change of the motor with time in the control method for the wall-mounted drum washing machine in accordance with the fourth embodiment of the present invention.

FIG. 34 is a flowchart illustrating the control method for the wall-mounted drum washing machine in accordance with the fourth embodiment of the present invention. FIG. 35 is a graph illustrating RPM change of the motor with time in the control method for the wall-mounted drum washing machine in accordance with the fourth embodiment of the present invention.

In the above-described second and third embodiments, it has been described that, when the RPM of the motor 41 reaches the reference speed (a), the control unit 140 opens the water supply valve 74.

However, when a preset time $t_S$ passes from the time at which the control unit 140 stopped the control for the motor 41 because the maintenance time $t_M$ passed, the control unit 140 may open the water supply valve 74 to remove the foams of the detergent box 90 and the conditioner box 100.

Referring to FIG. 34, when the RPM of motor 41 reaches the maximum speed Max at step S300 and the maintenance time $t_M$ for maintaining the maximum speed Max is passes at step S310, the control unit 140 stops the control for the motor 41 at step S320.

When the control unit 140 stops the control for the motor 41, the RPM of the motor 41 gradually decreases.

Then, the control unit 140 receives the RPM of the motor 41 from the RPM detection unit 130 at step S330, and checks whether or not the preset time $t_S$ passes from the time at which a spin-drying process is completed, at step S340.

The preset time $t_S$ indicates a reference time for removing foams of the detergent box 90 and the conditioner box 100 after the spin-drying process is completed, and may be selected in various manners depending on the specifications of products or systems to be applied.

When the preset time $t_S$ passes from the time point at which the spin-drying process is completed, the control unit 140 opens the water supply valve 74 at step S350, and rotates the motor 41 at a speed (b) when the preset time $t_S$ passed, at step S360.

Then, steps S370 to S390 in which the control unit 140 determines whether or not the foam removal time $t_F$ passes, closes the water supply valve 74, and stops the control for the motor 41 may be performed in the same manner as the steps S160 to S180 of the above-described embodiment. Thus, the detailed descriptions thereof are omitted herein.

In the control method of the wall-mounted drum washing machine in accordance with the second to fourth embodiments of the present invention, water is supplied for a predetermined time at the final stage of the spin-drying process in the wall-mounted drum washing machine in which the detergent box 90 and the conditioner box 100 are integrated with the tub 20, thereby removing the foams introduced into the detergent box 90 and the conditioner box 100 during the spin-drying process.

Furthermore, while the water supply valve 74 is opened to supply water, the control unit 140 may rotate the motor 41 at a predetermined speed to remove the foams introduced into the detergent box 90 and the conditioner box 100, while preventing the water from being introduced into the drum 23.

Furthermore, whenever the rinsing process is completed, foams introduced into the detergent box 90 and the conditioner box 100 or detergent residue may be removed. Thus, the detergent box 90 and the conditioner box 100 may be cleanly maintained to thereby increase consumers' satisfaction.

In the present embodiments, the wall-mounted drum washing machine has been taken as an example for description. However, this is only an example, and the present invention may be applied to other products.

Furthermore, in the second to fourth embodiments of the present invention, a case in which the time during which the water supply valve 74 is opened is equal to the time during which the motor 41 is rotated at a predetermined speed (a or b) has been taken as an example for description. However, the opening time of the water supply valve 74 and the rotation time of the motor 41 may be selected as different values within the range in which the objective of the present invention may be accomplished.

Referring to FIG. 29, components which are used in a control method for the wall-mounted drum washing machine in accordance with a fifth embodiment of the present invention will be described in detail. The wall-mounted drum washing machine includes the RPM detection unit 130, the control unit 140, the motor 41, the water supply valve 74, and the drain device 75.

The RPM detection unit 130 detects the RPM of the motor 41 and transmits the detected RPM to the control unit 140.

The RPM detection unit 130 may include a hall sensor (not illustrated) attached on a stator (not illustrated) of the motor 41 and configured to generate a pulse signal whenever a magnetic force radiated from a permanent magnet attached to a rotor (not illustrated) of the motor 41 is detected.

The RPM detection unit 130 may include an encoder to measure the RPM of the motor 41.

The control unit 140 reduces the RPM of the motor 41 during a deceleration section of a spin-drying process of the wall-mounted drum washing machine. When the RPM of the motor 41 reaches a preset speed, the control unit 140 opens the water supply valve 74 to supply water while maintaining the preset speed, for a preset time. Then, detergent residue remaining in the drain pipe may be discharged.

During the spin-drying process, the drain device 75 is opened. Thus, while water is supplied, detergent residue in the drain pipe 75a may be discharged by the supplied water, and detergent residue in the tub 20 may be discharged together. Therefore, the spin-drying process may be ended in a clean state.

At this time, the control unit 140 may rotate the motor 41 at the preset speed of 300 RPM, thereby preventing the supplied water from being introduced into the drum 23.

Figure 36:
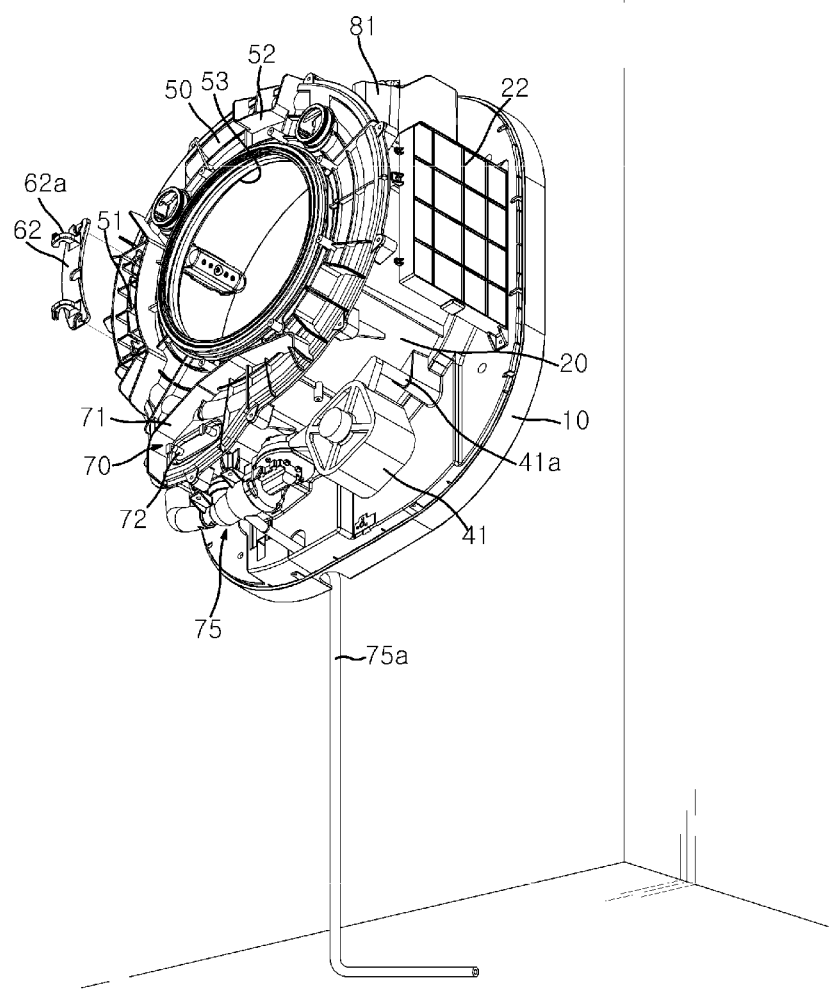
FIG. 36 is a diagram illustrating an installation state of a drain pipe in the wall-mounted drum washing machine in accordance with the embodiment of the present invention.

FIG. 36 is a diagram illustrating an installation state of the drain pipe in the wall-mounted drum washing machine in accordance with the embodiment of the present invention.

As illustrated in FIG. 36, the wall-mounted drum washing machine has a small capacity and is installed on a wall surface at a predetermined height. Thus, the drain pipe 75a may be installed to be extended.

Thus, when foams or detergent residues are not smoothly discharged because of the bent drain pipe 75a while the drain device 75 is operated to discharge water through the drain pipe 75a, the foams or detergent residues may be left in the drain pipe 75a and thus cause a drain defect.

In order to prevent clogging of the drain pipe, water may be applied to remove detergent residues in the drain pipe, before the spin-drying process is finished. Thus, it is possible to prevent a drain defect caused by the clogging of the drain pipe, while maintaining the drain pipe in a clean state.

Figure 37:
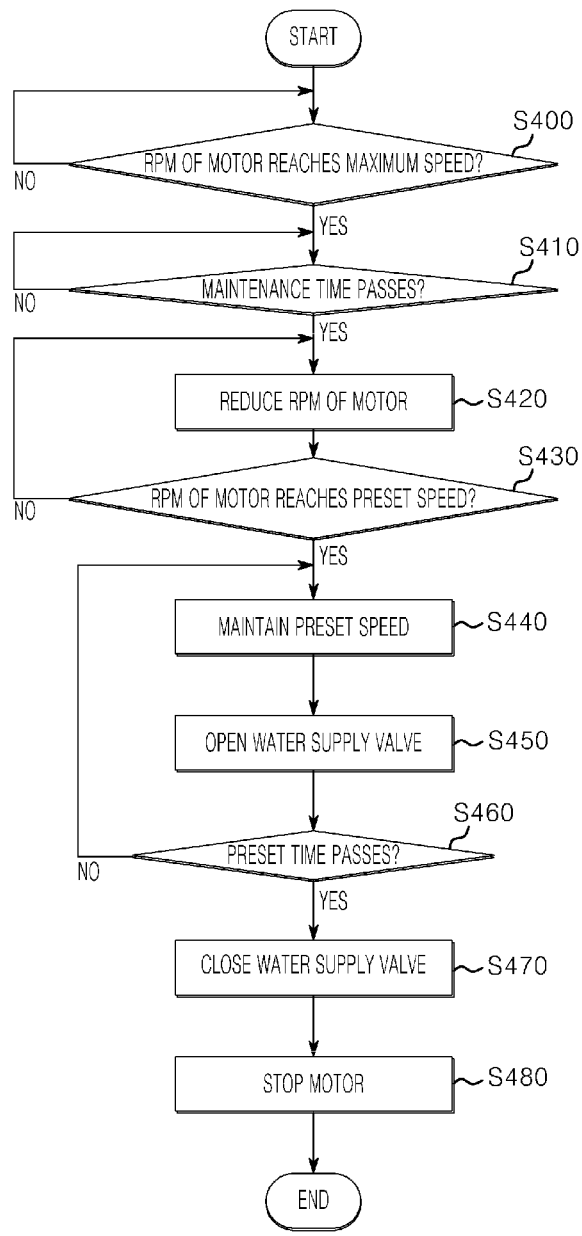
FIG. 37 is a flowchart for explaining the control method for the wall-mounted drum washing machine in accordance with the fifth embodiment of the present invention.
Figure 38:
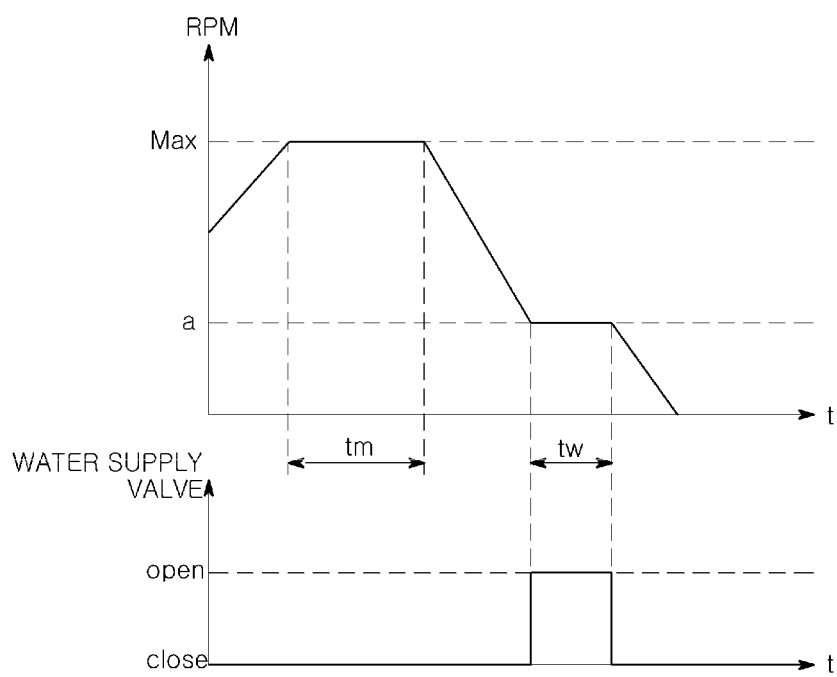
FIG. 38 is a graph illustrating RPM change of the motor with time in the control method for the wall-mounted drum washing machine in accordance with the fifth embodiment of the present invention.

FIG. 37 is a flowchart for explaining the control method for the wall-mounted drum washing machine in accordance with the fifth embodiment of the present invention. FIG. 38 is a graph illustrating RPM change of the motor with time in the control method for the wall-mounted drum washing machine in accordance with the fifth embodiment of the present invention.

Referring to FIGS. 37 and 38, the control method for the wall-mounted drum washing machine in accordance with the fifth embodiment of the present invention is performed as follows. First, the control unit 140 receives the RPM of the motor 41 through the RPM detection unit 130 and determines whether or not the RPM reaches a maximum speed Max, during a spin-drying process, at step S400.

When the RPM of the motor 41 reaches the maximum speed Max, the control unit 140 determines whether or not a maintenance time $t_M$ passes at step S410. During the maintenance time $t_M$, the maximum speed Max is maintained.

At this time, when the maintenance time $t_M$ passes, the control unit 140 reduces the RPM of the motor 41 so as to end the spin-drying process, at step S420.

Then, the control unit 140 determines whether or not the RPM of the motor 41 reaches a preset speed (a), at step S430.

When the RPM of the motor 41 reaches the preset speed (a), the control unit 140 maintains the preset speed (a) at step S440, and opens the water supply valve 74 to supply water for a preset time $t_W$, at steps S450 and S460.

As the water supply valve 74 is opened to supply water in a state where the preset speed (a) is maintained, the supplied water may be prevented from being introduced into the drum 23.

Furthermore, as the water is supplied at a final stage of the spin-drying process, detergent residues in the drain pipe 75a may be removed to prevent a drain defect caused by clogging of the drain pipe 75a. Furthermore, the drain pipe 75a may be maintained in a clean state.

After the water is supplied for the preset time, the control unit 140 closes the water supply valve 74 and stops the motor 41, at steps S470 and S480. Then, the spin-drying process is ended.

In the control method for the wall-mounted drum washing machine in accordance with the fifth embodiment of the present invention, water may be supplied for the preset time at the final stage of the spin-drying process. Thus, the detergent residues in the elongated drain pipe 75*a* may be removed to prevent clogging of the drain pipe 75*a*.

Furthermore, while the water supply valve 74 is opened to supply water, the motor 41 may be rotated at the preset speed so as to remove detergent residues and foams remaining in the tub 20, which makes it possible to maintain the tube 20 in a clean state.

In accordance with the embodiments of the present invention, when a proper amount of detergent or more is used while a washing process is performed through the wall-mounted drum washing machine, the level of foams formed by the detergent may be measured. When the level exceeds the reference level, a predetermined number of rinsing processes may be added to improve the cleaning ability of the wall-mounted drum washing machine.

Furthermore, in the wall-mounted drum washing machine including the detergent box and the conditioner box which are inserted into the tub, water may be supplied for a predetermined time at the final stage of the spin-drying process, thereby removing foams introduced into the detergent box or conditioner box during the spin-drying process.

Furthermore, water may be supplied for a predetermined time at the final stage of the spin-drying process so as to remove detergent residue in the elongated drain pipe. Thus, it is possible to prevent clogging of the drain pipe caused by the detergent residues. Furthermore, it is possible to prevent a drain defect caused by the clogging of the drain pipe and maintain the drain pipe in a clean state.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A control method for a wall-mounted drum washing machine including a detergent box and a conditioner box which are inserted into a tub through a front panel, the control method comprising:
    stopping, by a control unit, control for a motor during a spin-drying process;
    determining, by the control unit, whether or not a foam removal condition is satisfied, after the control for the motor is stopped;
    opening, by the control unit, a water supply valve for a preset foam removal time in order to remove foams of the detergent box and the conditioner box, when it is determined that the foam removal condition is satisfied; and
    stopping, by the control unit, the motor to complete the spin-drying process, after the foam removal time passes, wherein the foam removal condition is satisfied when a preset time passes from the time at which the control for the motor is stopped, wherein the control unit rotates the motor at an RPM at the time at which the preset time passed, for the foam removal time, and
    wherein a drum disposed on the tub is not dipped into water supplied from the water supply valve.

2. The control method of claim 1, wherein the foam removal condition is satisfied when the RPM of the motor reaches a preset reference speed.

3. The control method of claim 2, wherein the control unit rotates the motor at the reference speed for the foam removal time.

* * * * *